United States Patent
Cevik et al.

(10) Patent No.: US 12,362,107 B2
(45) Date of Patent: Jul. 15, 2025

(54) NON-FLAMMABLE REDOX-MEDIATED BIOELECTROLYTE

(71) Applicant: Imam Abdulrahman Bin Faisal University, Dammam (SA)

(72) Inventors: Emre Cevik, Dammam (SA); Atheel Awad Almofleh, Dammam (SA); Ayhan Bozkurt, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 117 days.

(21) Appl. No.: 18/512,835

(22) Filed: Nov. 17, 2023

(65) Prior Publication Data
US 2025/0166934 A1    May 22, 2025

(51) Int. Cl.
*H01G 11/56* (2013.01)
*H01G 11/34* (2013.01)

(52) U.S. Cl.
CPC ............ *H01G 11/56* (2013.01); *H01G 11/34* (2013.01)

(58) Field of Classification Search
None
See application file for complete search history.

(56) References Cited

U.S. PATENT DOCUMENTS

| | | | |
|---|---|---|---|
| 7,998,360 B2 | 8/2011 | Takeda et al. | |
| 8,390,989 B2 | 3/2013 | Ning et al. | |
| 10,685,790 B2 | 6/2020 | Vindt et al. | |
| 11,328,877 B2 | 5/2022 | Bozkurt et al. | |
| 2006/0076541 A1* | 4/2006 | Yoshida | H01B 1/127 252/500 |
| 2009/0021894 A1* | 1/2009 | Ning | H01B 1/124 29/25.03 |
| 2011/0051323 A1* | 3/2011 | Ning | H01G 11/56 29/25.03 |
| 2011/0080690 A1* | 4/2011 | Ning | H01G 9/028 29/25.03 |

FOREIGN PATENT DOCUMENTS

CN    107887173 A    4/2018

OTHER PUBLICATIONS

Gunday et al.; Synthesis of Boron-Doped Non-Flammable Anhydrous Electrolytes for Flexible Quasi-Solid-State Supercapacitor Applications; Energy 2022, 36, 21; Oct. 25, 2022; 2 Pages; Abstract Only.

Song et al.; Ternary-doped carbon electrodes for advanced aqueous solid-state supercapacitors based on a "water-in-salt" gel electrolyte; Journal of Materials Chemistry A, Issue 26; 2019; Abstract Only; 2 Pages.

* cited by examiner

*Primary Examiner* — Eric W Thomas
(74) *Attorney, Agent, or Firm* — Oblon, McClelland, Maier & Neustadt, L.L.P.

(57) ABSTRACT

A supercapacitor including two electrodes, and a gel electrolyte. The gel electrolyte includes glycerol, benzoquinone, phosphoric acid, and boric acid. The gel electrolyte is non-aqueous. The glycerol, phosphoric acid, and boric acid form a hydrogen bonding network. The benzoquinone is homogeneously dispersed within the hydrogen bonding network. The supercapacitor is included in wearable devices or power banks.

17 Claims, 17 Drawing Sheets

NON-FLAMMABLE REDOX-MEDIATED BIOELECTROLYTE

STATEMENT OF ACKNOWLEDGEMENT

The support of the Deputyship for Research & Innovation, Ministry of Education in Saudi Arabia for funding this research work is gratefully acknowledged.

BACKGROUND

Technical Field

The present disclosure is directed to an electrolyte, particularly to a supercapacitor with a non-flammable redox-mediated bioelectrolyte.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Supercapacitors in energy storage systems are a viable option, especially in various electronic systems, by providing fast storage, low cost, and environmentally friendly solutions. Modifying the components of the supercapacitor such as the electrolyte, can boost supercapacitor performance.

Typically, a suitable electrolyte offers a wide voltage window, high electrochemical stability, high ionic concentration and conductivity, low viscosity, and low toxicity. In recent years, bio-based polymer electrolytes, such as starch, chitosan, and vegetable oil-based polymers, are increasingly used as alternatives to conventional electrolytes in supercapacitors due to low toxicity, light weight, and ease of fabrication to electrochemical devices. More recently, gel polymer electrolytes are also being used in the application of electrochemical devices. The resultant ion gel enables the movement of the ions onto the electrodes' pores. These polymer blends display high mechanical characteristics and low likelihood of safety challenges, such as flammability, in the process of manufacture.

Redox mediators have attracted interest in industrial fields such as chemical sensors, energy storage systems, and electrocatalysis that interact with the surface of the electrodes chemically through oxidation-reduction reactions. In improving energy storage, using a redox mediator enhances the performance of stored energy due to the pseudo-capacitor contribution through the chemical species in the electrolyte. Besides the long cycle life due to the conventional electrostatic double-layer capacitors (EDLCs) mechanism, the contribution of the redox mediator can increase energy storage. Quinones have proven to be highly effective redox electrolyte additions in liquid electrolytes and they improve specific capacitance, specific energy and reduce the charge transfer resistance of supercapacitors.

Although several gel-based electrolytes have been reported in the literature, there exists a need to develop electrolytes with high ionic conductivity, chemical stability, and electrochemical stability to assemble supercapacitors with prolonged cycle life. Accordingly, it is one object of the present disclosure to provide a gel electrolyte including a redox mediator which may substantially reduce or eliminate the above limitations.

SUMMARY

In an exemplary embodiment, a supercapacitor is described. The supercapacitor includes two electrodes, and a gel electrolyte. The gel electrolyte includes glycerol, benzoquinone, phosphoric acid, and boric acid. The gel electrolyte is non-aqueous. The glycerol, phosphoric acid, and boric acid form a hydrogen bonding network. The benzoquinone is homogeneously dispersed within the hydrogen bonding network.

In some embodiments, the two electrodes each include a substrate and a mixture of a conductive additive, a binding compound, and an activated carbon at least partially coated on an inner surface of the substrate. The two electrodes are disposed with the inner surfaces facing each other separated by the gel electrolyte to form the supercapacitor.

In some embodiments, the mixture includes 5-10 wt. % of the conductive additive, 5-10 wt. % of the binding compound, and 80-90 wt. % of the activated carbon, based on the total weight of the conductive additive, the binding compound, and the activated carbon.

In some embodiments, the gel electrolyte includes 1-60 wt. % of the benzoquinone, based on a total weight of the phosphoric acid and the glycerol.

In some embodiments, in the gel electrolyte the phosphoric acid has a molarity of 1-5 molars (M) in the glycerol.

In some embodiments, in the gel electrolyte the boric acid has a molarity of 1-5 M in the glycerol.

In some embodiments, the gel electrolyte includes 1-60 wt. % of the benzoquinone, based on a total weight of the phosphoric acid and the glycerol. The phosphoric acid has a molarity of 1-5 M in the glycerol, and the boric acid has a molarity of 1-5 M in the glycerol.

In some embodiments, the gel electrolyte produces no fire after treatment with a flame.

In some embodiments, the gel electrolyte has a surface contact angle of 60-70°.

In an exemplary embodiment, a method for making the gel electrolyte is described. The method includes mixing a 1-5 M solution of the phosphoric acid in the glycerol to form a phosphoric acid solution. The method includes mixing 1-60 wt. % of the benzoquinone with the phosphoric acid solution to form a benzoquinone solution. The method includes mixing an amount of the boric acid to be 1-5 M in the benzoquinone mixture to form the gel electrolyte.

In some embodiments, the binding compound is a fluorinated polymer.

In some embodiments, the conductive additive is at least one selected from the group consisting of graphite, reduced graphene oxide, carbon nanotubes, carbon nanofibers, and carbon black.

In some embodiments, the substrate is made from at least one material selected from the group consisting of copper, aluminum, nickel, iron, and steel.

In some embodiments, the supercapacitor has a specific capacitance of 250-300 farads per gram (F/g) at 1 ampere per gram (A/g).

In some embodiments, the supercapacitor maintains at least 90% of a capacitance after 10,000 charge/discharge cycles.

In some embodiments, the supercapacitor has a specific energy of 40-55 watt-hour per kilogram (Wh/kg) at a power of 270 watt per kilogram (W/kg).

In some embodiments, a wearable device including the supercapacitor. The supercapacitor is electrically connected to a sensor. The supercapacitor functions as a battery.

In some embodiments, a power bank includes 2-10 of the supercapacitors connected in parallel and/or series.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
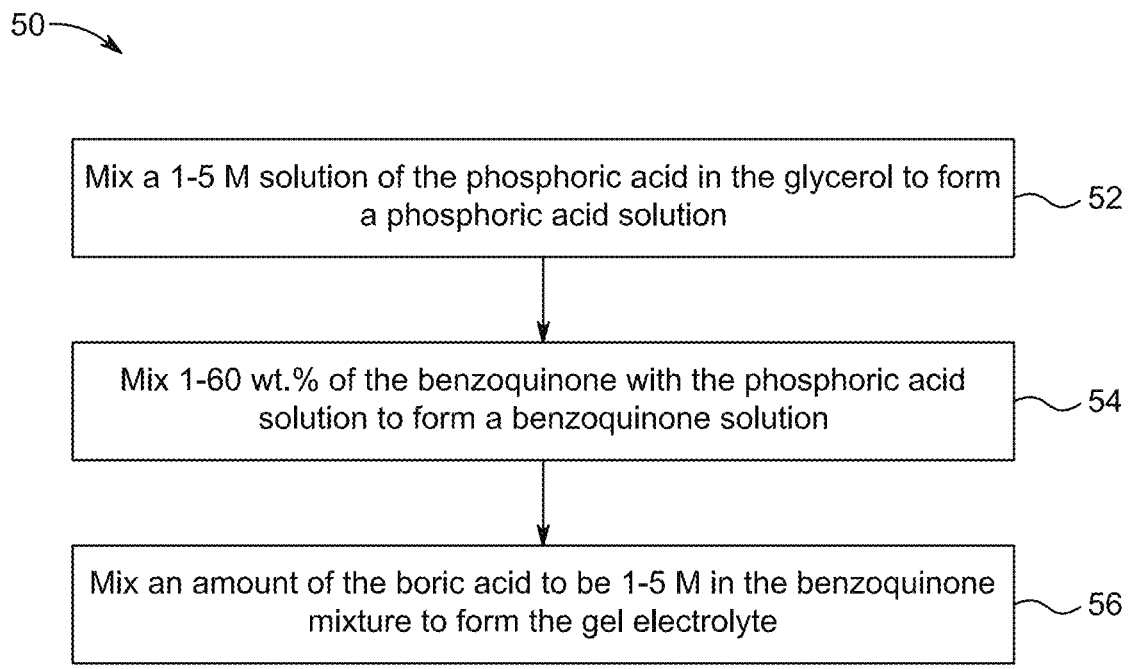
FIG. 1 is a flowchart depicting a method of making a gel electrolyte, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Where a numerical limit or range is stated herein, the endpoints are included. Also, all values and subranges within a numerical limit or range are specifically included as if explicitly written out.

As used herein, the term 'electrode' refers to an electrical conductor that contacts a non-metallic part of a circuit, e.g., a semiconductor, an electrolyte, a vacuum, or air.

As used herein, the term 'electrolyte' is a substance that forms a solution that can conduct electricity when dissolved in a polar solvent.

As used herein, the term 'bioelectrolyte' refers to an electrolyte including a naturally occurring substance, in the present disclosure the naturally occurring substance is glycerol.

According to an aspect of the present disclosure, a supercapacitor is described. The supercapacitor includes a gel electrolyte. The gel electrolyte includes glycerol, benzoquinone, phosphoric acid, and boric acid. The glycerol, phosphoric acid, and boric acid form a hydrogen bonding network, while the benzoquinone is homogeneously dispersed within the hydrogen bonding network. In a preferred embodiment, the —OH groups of the phosphoric acid, and boric acid hydrogen bond with at least one —OH of the glycerol, and this pattern continues thereby forming a network. The gel electrolyte may be aqueous or non-aqueous. In a preferred embodiment, the gel electrolyte is non-aqueous. In a preferred embodiment, the gel electrolyte includes less than 5 ppm, preferably 4 ppm, 3 ppm, 2 ppm, 1 ppm or has no water present based on a total weight of the gel electrolyte.

In some embodiments, the glycerol may be replaced by propylene glycol, 1,3-butylene glycol, 1,4-butylene glycol, digylcerol, isoprene glycol, dimethylolpropionic acid, butanediol, 1,5-pentanediol, 1,6-hexanediol, 1,9-nonanediol, neopentyl glycol, trimethylolethane, trimethylolpropane, thiodiethanol, tartaric acid, D-glucaric acid and glutaconic acid; and aromatic compounds such as 1,4-dihydroxybenzene, 1,3-dihydroxybenzene, 2,3-dihydroxy-1-pentadecylbenzene, 2,4-dihydroxyacetophenone, 2,5-dihydroxyacetophenone, 2,4-dihydroxybenzophenone, 2,6-dihydroxybenzophenone, 3,4-dihydroxybenzophenone, 3,5-dihydroxybenzophenone, 2,4'-dihydroxydiphenylsulfone, 2,2',5,5'-tetrahydroxydiphenylsulfone, 3,3',5,5'-tetramethyl-4,4'-dihydroxydiphenylsulfone, hydroxyquinonecarboxylic acid and salts thereof, 2,3-dihydroxybenzoic acid, 2,4-dihydroxybenzoic acid, 2,5-dihydroxybenzoic acid, 2,6-dihydroxybenzoic acid, 3,5-dihydroxybenzoic acid, 1,4-hydroquinonesulfonic acid and salts thereof, 4,5-hydroxybenzene-1,3-disulfonic acid and salts thereof, 1,5-dihydroxynaphthalene, 1,6-dihydroxynaphthalene, 2,6-dihydroxynaphthalene, 2,7-dihydroxynaphthalene, 2,3-dihydroxynaphthalene, 1,5-dihydroxynaphthalene-2,6-dicarboxylic acid, 1,6-dihydroxynaphthalene-2,5-dicarboxylic acid, 1,5-dihydroxynaphthoic acid, phenyl 1,4-dihydroxy-2-naphthoate, 4,5-dihydroxynaphthalene-2,7-disulfonic acid and salts thereof, 1,8-dihydroxy-3,6-naphthalenedisulfonic acid and salts thereof, 6,7-dihydroxy-2-naphthalenesulfonic acid and salts thereof, 1,2,3-trihydroxybenzene (pyrogallol), 1,2,4-trihydroxybenzene, 5-methyl-1,2,3-trihydroxybenzene, 5-ethyl-1,2,3-trihydroxybenzene, 5-propyl-1,2,3-trihydroxybenzene, trihydroxybenzoic acid, trihydroxyacetophenone, trihydroxybenzophenone, trihydroxybenzaldehyde, trihydroxyanthraquinone, 2,4,6-trihydroxybenzene, tetrahydroxy-p-benzoquinone, tetrahydroxyanthraquinone, methyl gallate, ethyl gallate and potassium hydroquinone sulfonate.

In some embodiments, the boric acid and/or the phosphoric acid may be replaced by organic acids such as adipic acid, glutaric acid, succinic acid, benzoic acid, isophthalic acid, phthalic acid, terephthalic acid, maleic acid, toluic acid, enanthic acid, malonic acid, formic acid, a decanedicarboxylic acid such as 1,6-decanedicarboxylic acid or 5,6-decanedicarboxylic acid, an octanedicarboxylic acid such as 1,7-octanedicarboxylic acid, azelaic acid or sebacic acid, or an inorganic acid such as a boric acid polyhydric alcohol complex compound obtained from boric acid and a polyhydric alcohol, carbonic acid or silicic acid.

In some embodiments, the benzoquinone may be replaced with any quinone derivative. The quinones are a class of organic compounds that are formally "derived from aromatic compounds, such as benzene or naphthalene, by conversion of an even number of —CH= groups into —C(=O)— groups with any necessary rearrangement of double bonds, resulting in "a fully conjugated cyclic dione structure". Examples of quinones include but are not limited to 1,4-benzoquinone, 1,2-benzoquinone (ortho-quinone), 1,4-naphthoquinone and 9,10-anthraquinone.

The gel electrolyte includes about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, and about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 26 wt. %, about 27 wt. %, about 28 wt. %, about 29 wt. %, about 30 wt. %, about 31 wt. %, about 32 wt. %, about 33 wt. %, about 34 wt. %, about 35 wt. %, about 36 wt. %, about 37 wt. %, about 38 wt. %, about 39 wt. %, about 40 wt. %, about 41 wt. %, about 42 wt. %, about 43 wt. %, about 44 wt. %, about 45 wt. %, about 46 wt. %, about 47 wt. %, about 48 wt. %, about 49 wt. %, about 50 wt. %, about 51 wt. %, about 52 wt. %, about 53 wt. %, about 54 wt. %, about 55 wt. %, about 56 wt. %, about 57 wt. %, about 58 wt. %, and about 59 wt. % of the benzoquinone. The gel electrolyte includes up to about 60 wt. % of the benzoquinone, based on the total weight of the phosphoric acid and the glycerol. The gel electrolyte includes 1-60 wt. % of the benzoquinone, based on the total weight of the phosphoric acid and the glycerol.

The concentration of the phosphoric acid in the gel electrolyte is in the range of 1-5 molar (M), preferably 1 M, about 2 M, about 3 M, about 4 M, and about 5 M in the glycerol; and the concentration of boric acid in the gel electrolyte is in the range of 1-5 M, preferably 1 M, about 2 M, about 3 M, about 4 M, and about 5 M in the glycerol.

In an embodiment, the gel electrolyte further includes at least one boronic acid-containing polymer selected from the group consisting of poly(styreneboronic acid)-β-polystyrene and poly(ethylene glycol)-β-poly(styreneboronic acid). In an embodiment, 1-15 wt. %, preferably 5-13, or 10-12 wt. % of the boronic acid-containing polymer is added to the gel electrolyte relative to the total weight of the gel electrolyte.

The gel electrolyte produces no fire after treatment with a flame. In a preferred embodiment, the gel electrolyte does not catch fire after being exposed to a flame for at least 1 minute, preferably 10 minutes, or preferably 1 hour. The gel electrolyte has a surface contact angle of about 60°, about 61°, about 62°, about 63°, about 64°, about 65°, about 66°, about 67°, about 68°, and about 69°. The gel electrolyte has a surface contact angle up to about 70°. The gel electrolyte has a surface contact angle of 60-70°. As used herein, the term contact angle refers to the angle between a tangent to a liquid surface and a solid surface at this point.

FIG. 1 illustrates a schematic flow chart of a method 50 of making the gel electrolyte. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes mixing about 1 M, about 2 M, about 3 M, and about 4 M solution of the phosphoric acid in the glycerol to form a phosphoric acid solution. In some embodiments, the method 50 includes mixing up to about 5 M solution of the phosphoric acid in the glycerol to form the phosphoric acid solution. In some embodiments, the method 50 includes mixing a 1-5 M, more preferably 3 M, solution of the phosphoric acid in the glycerol to form the phosphoric acid solution.

At step 54, the method 50 includes mixing about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, and about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 26 wt. %, about 27 wt. %, about 28 wt. %, about 29 wt. %, about 30 wt. %, about 31 wt. %, about 32 wt. %, about 33 wt. %, about 34 wt. %, about 35 wt. %, about 36 wt. %, about 37 wt. %, about 38 wt. %, about 39 wt. %, about 40 wt. %, about 41 wt. %, about 42 wt. %, about 43 wt. %, about 44 wt. %, about 45 wt. %, about 46 wt. %, about 47 wt. %, about 48 wt. %, about 49 wt. %, about 50 wt. %, about 51 wt. %, about 52 wt. %, about 53 wt. %, about 54 wt. %, about 55 wt. %, about 56 wt. %, about 57 wt. %, about 58 wt. %, and about 59 wt. % of benzoquinone with the phosphoric acid solution to form a benzoquinone solution. In some embodiments, the method 50 includes mixing up about 60 wt. % of benzoquinone with the phosphoric acid solution to form the benzoquinone solution. In some embodiments, the method 50 includes mixing 1-60 wt. % of the benzoquinone with the phosphoric acid solution to form the benzoquinone solution.

At step 56, the method 50 includes mixing about 1 M, about 2 M, about 3 M, and about 4 M solution of the boric acid in the benzoquinone mixture to form a gel electrolyte. In some embodiments, the method 50 includes mixing up to about 5 M solution of the boric acid in the benzoquinone mixture to form the gel electrolyte. In some embodiments, other modes of mixing known to those of ordinary skill in the art, for example, via stirring, swirling, or a combination thereof, may be employed to form the resultant mixture.

The supercapacitor includes two electrodes, a positive electrode, and a negative electrode. The two electrodes each include a substrate. The substrate is made from at least one material selected from the group consisting of copper, aluminum, nickel, iron, and steel. In an embodiment, the steel substrate may include but is not limited to, stainless steel, crucible steel, carbon steel, spring steel, alloy steel, maraging steel, weathering steel, tool steel, or any combination thereof. In some embodiments, the steel substrate may be a steel mesh substrate. The steel mesh substrate may act as a current collector. In some embodiments, the current collector may be metallic. In some embodiments, the current collector may be ferrite.

In another embodiment, the substrate may be a transparent substrate. The transparent substrate is a glass substrate. The glass substrate is at least one selected from the group consisting of a fluorine-doped tin oxide (FTO) coated glass substrate, a tin-doped indium oxide (ITO) coated glass substrate, an aluminum doped zinc oxide (AZO) coated glass substrate, a niobium doped titanium dioxide (NTO) coated glass substrate, an indium doped cadmium oxide (ICO) coated glass substrate, an indium doped zinc oxide (IZO) coated glass substrate, a fluorine-doped zinc oxide (FZO) coated glass substrate, a gallium doped zinc oxide (GZO) coated glass substrate, an antimony doped tin oxide (ATO) coated glass substrate, a phosphorus-doped tin oxide (PTO) coated glass substrate, a zinc antimonate coated glass substrate, a zinc oxide coated glass substrate, a ruthenium oxide coated glass substrate, a rhenium oxide coated glass substrate, a silver oxide coated glass substrate, and a nickel oxide coated glass substrate. In some embodiments, elements such as Ni, Al, Cu, Fe, Ag, Zn, Sn, Sb, Ti, In, V, Cr, Co, C, Ca, Mo, Au, P, W, Rh, Mn, B, Si Ge, Se, Ln, Ga, Ir, and an alloy or a mixture of two or more of the substance, may be disposed on the surface of the transparent substrate.

The two electrodes each further include a mixture of a conductive additive, a binding compound, and an activated carbon at least partially coated on the inner surface of the substrate. In an embodiment, at least 50%, preferably 60%, 70%, 80%, 90%, or 100% of the inner surface is coated with the mixture. The coating can be done by any method know in the art, including but not limited to spin coating, drop casting or using an automatic coating machine. In an embodiment, the coating has a thickness of 1-50 μm on the substrate, preferably 10-40 μm or 20-30 μm.

The conductive additive is at least one selected from the group consisting of graphite, reduced graphene oxide, carbon nanotubes, carbon nanofibers, and carbon black. In some embodiments, the conductive additive may be activated carbon (AC). In some embodiments, the conductive additive may include but is not limited to, carbide-derived carbon (CDC), carbon aerogel, and graphene.

As used herein, the term 'binding compound' refers to the binding material responsible for holding the active material particles within the electrode together to maintain a strong connection between the electrode and contacts. Such binding materials are normally inert and have an important role in the manufacturability of the battery. The binding compound is a fluorinated polymer. In one embodiment, the binding compound is one or more selected from a group consisting of polyvinylidene fluoride (PVDF)-based polymers, and its co- and terpolymers with hexafluoro ethylene, tetrafluoroethylene, chlorotrifluoroethylene, polyvinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers. In some embodiments, the binding compound is PVDF. The binding compound and the conductive additive in an electrode impart a firm structure and a continuous conduction path.

The mixture includes about 5 wt. %, about 6 wt. %, about 7 wt. %, about 8 wt. %, and about 9 wt. % of the conductive additive. The mixture includes up to about 10 wt. % of the conductive additive. The mixture includes about 5 wt. %, about 6 wt. %, about 7 wt. %, about 8 wt. %, and about 9 wt. % of the binding compound. The mixture includes up to about 10 wt. % of the binding compound. The mixture includes about 80 wt. %, about 81 wt. %, about 82 wt. %, about 83 wt. %, about 84 wt. %, about 85 wt. %, about 86 wt. %, about 87 wt. %, about 88 wt. %, about 89 wt. % of the activated carbon. The mixture includes up to about 90 wt. % of the activated carbon. The mixture includes 5-10 wt. % of the conductive additive, 5-10 wt. % of the binding compound, and 80-90 wt. % of the activated carbon, based on the total weight of the conductive additive, the binding compound, and the activated carbon.

In an embodiment, the mixture further includes 1-10 wt. %, preferably 1-5 wt. %, or 1-3 wt. %, of at least one boronic acid-containing polymer selected from the group consisting of poly(styreneboronic acid)-β-polystyrene, and poly(ethylene glycol)-β-poly(styrene boronic acid), based on the total weight of the conductive additive, the binding compound, the activated carbon, and the boronic acid-containing polymer. In an embodiment, the inner surface is pre-coated with at least one boronic acid-containing polymer selected from the group consisting of poly(styreneboronic acid)-β-polystyrene and poly(ethylene glycol)-β-poly(styrene boronic acid).

As previously described in some embodiments, at least one boronic acid-containing polymer selected from the group consisting of poly(styreneboronic acid)-β-polystyrene and poly(ethylene glycol)-β-poly(styrene boronic acid), is included in the gel electrolyte or on the substrate, and/or pre-coated on the inner surface of the supercapacitor substrate. These boronic acid containing polymers promote interaction between the gel electrolyte and the surface and/or mixture in which they are present. In an embodiment, the boronic acid containing polymer is included in the gel electrolyte, thereby interactions of the boronic acid in the polymer and the boric acid increase the stability and viscosity of the gel. In an embodiment, the boronic acid containing polymer is included in the mixture of the supercapacitor, thereby promoting interactions of the boronic acid in the polymer and the boric acid in the gel to increase the contact surface area of the electrolyte and the activated carbon. In an embodiment, the boronic acid containing polymer is pre-coated on the inner surface of the of the supercapacitor substrate, thereby promoting interactions of the boronic acid in the polymer and the boric acid in the gel, which increase the contact surface area of the electrolyte, the activated carbon and the substrate. In some embodiments, higher electrolyte contact surface areas improve charge transport properties.

The two electrodes are disposed with the inner surfaces facing each other, separated by the gel electrolyte to form the supercapacitor. In some embodiments, a separator may also be present in the supercapacitor. The separator may be selected from a group including polypropylene (PP) membrane, glass fiber, and cellulose fiber. In some embodiments, the separator may include bacterial cellulose fiber, a polyolefin such as polyethylene (PE), or a combination of PP and PE.

The supercapacitor has a specific capacitance of about 250 farads per gram (F/g), about 260 F/g, about 270 F/g, about 280 F/g, and about 290 F/g at 1 ampere per gram (A/g). The supercapacitor has a specific capacitance of up to about 300 F/g at 1 ampere per gram (A/g). The supercapacitor has a specific capacitance of 250-300 farads per gram (F/g) at 1 ampere per gram (A/g). The supercapacitor maintains at least 90%, preferably 92%, 94%, 96%, 98%, or 100% of the capacitance after 10,000 charge/discharge cycles. As used herein, the term 'capacitance' refers to the capability of a material object or device to store electric charge. It is measured by the charge in response to a difference in electric potential, expressed as the ratio of those quantities. The supercapacitor has a specific energy of about 40 Wh/kg, about 41 Wh/kg, about 42 Wh/kg, about 43 Wh/kg, about 44 Wh/kg, about 45 Wh/kg, about 46 Wh/kg, about 47 Wh/kg, about 48 Wh/kg, about 49 Wh/kg, about 50 Wh/kg, about 51 Wh/kg, about 52 Wh/kg, about 53 Wh/kg, and about 54 Wh/kg. The supercapacitor has a specific energy of about 55 Wh/kg. The supercapacitor has a specific energy of 40-55 Wh/kg and a power of 270 W/kg. As used herein, the term 'power' refers to the amount of energy transferred or converted per unit time.

In some embodiments, the gel electrolyte in the supercapacitor has an oxidation peak at 0.8-0.9V, preferably 0.81 V, 0.82 V, 0.83 V, 0.84 V, 0.85 V, 0.86 V, 0.87 V, 0.88 V, 0.89 V, or 0.90 V and a reduction peak at 0.6-0.7 V preferably 0.61 V, 0.62 V, 0.63 V, 0.64 V, 0.65 V, 0.66 V, 0.67 V, 0.68 V, 0.69 V, or 0.70 V In some embodiments, the gel electrolyte in the supercapacitor has an operation window of greater than 0 to 2 V, preferably 0.1 V, 0.2 V, 0.3 V, 0.4 V, 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, or 2.0 V.

While not wishing to be bound to a single theory, it is thought that the lack of water results in an improvement in the interface between the non-aqueous gel electrolyte and the electrode surface, thus improving the charge transfer and the overall performance of the fabricated supercapacitor. Also, the incorporation the benzoquinone raises the charge storage capacity of the system.

A wearable device, including the supercapacitor is described. The wearable device may include, but is not limited to, a smart ring, a smartwatch, a smart wristband such as a fitness tracker, augmented reality (AR) headsets, and reality (MR) headsets. The supercapacitor is electrically connected to a sensor and functions as a battery. In some embodiments, two or more supercapacitors may be connected in parallel and/or series. For example, a power bank includes about 2, about 3, about 4, about 5, about 6, about 7, about 8, and about 9 of the supercapacitors connected in parallel and/or series. The power bank includes up to about 10 of the supercapacitors connected in parallel and/or series. The power bank includes 2-10 of the supercapacitors connected in parallel and/or series.

EXAMPLES

The following details of the examples demonstrate a supercapacitor as described herein. The examples are provided solely for illustration and are not to be construed as limitations of the present disclosure, as many variations thereof are possible without departing from the spirit and scope of the present disclosure.

Example 1: Materials

Glycerol (Gly), benzoquinone was received from Sigma-Aldrich, USA, boric acid $H_3BO_3$ (BA), and phosphoric acid $H_3PO_4$ (purity >85%) was used for solution preparation. The electrode materials conductive carbon (CC), 2-Kuraray active carbon (AC) were used to prepare carbon ink, HSV 900 PVDF (polyvinylidene fluoride, electrode binder), and NMP (N-methyl-2-pyrrolidone) were purchased from Merck. Aluminum foil as a current collector was purchased from MTI Corporation, USA.

Example 2: Preparation of Activated Carbon Electrodes

The carbon electrode was produced by mixing conductive carbon, activated carbon, and polyvinyl fluoridone (PVDF) as a binder at weight fractions of 1:8:1, respectively. N-methyl pyrrolidone (NMP) is used as a solvent for the electrode paste preparation. The carbon paste was cast on aluminum paste with a thickness of 30 micrometers (μm) (MRX Shenzhen Automation Equipment). The carbon-coated aluminum foil was dried at 60° C. under vacuum for 18 h. Finally, the electrodes were cut into circular shapes with a diameter of 18 millimeters (mm) by using a disc cutter (Hi-Throughput Precision Pneumatic Disk Cutter)

Example 3: Preparation of the Aqueous and Non-Aqueous Electrolytes

To prepare the non-aqueous electrolytes, a solution of 3 M $H_3PO_4$ (3P) in Gly was prepared and labeled as (Gly3P). Then the redox mediator benzoquinone (BQ) was added in different weight percentages (X=10, 20, 30, and 50 w/w). Boric acid (BA) was then added in an amount to also be 3 M in the glycerol. The non-aqueous electrolytes were labeled as Gly3PXBQ3BA, where X is the weight percent of BQ.

The synthesis of the water (W) containing gel polymer electrolyte "(WGlyPBQ)" was performed by the addition of 30% volume of water to Gly3P labeled as 30WGly3P. The mixtures were homogenized under constant stirring at a temperature of 40° C. and then kept under a vacuum to prevent moisture formation. Redox-mediated gel electrolytes were obtained via doping of BQ at different weight percentages (X=10, 20, 30, and 50, w/w) labeled as the 30WGly3PXBQ gel electrolytes.

Example 4: Characterization and Performance

Figure 2A:
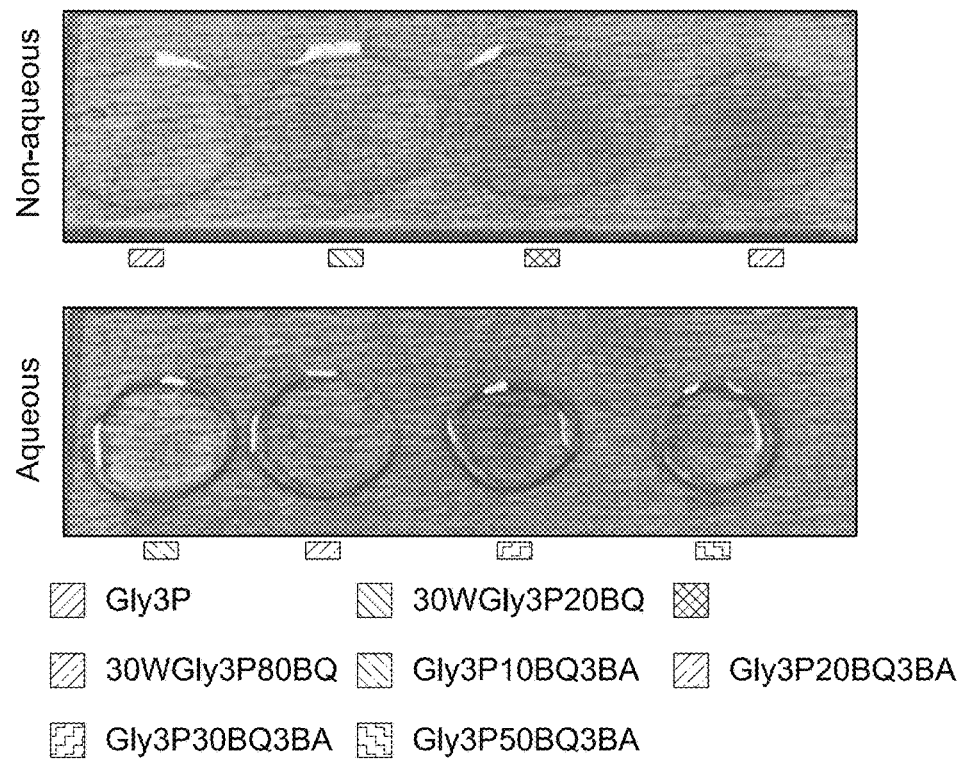
FIG. 2A is a photograph of aqueous and non-aqueous electrolytes, including different ratios of benzoquinone (BQ), according to certain embodiments.
Figure 2B:
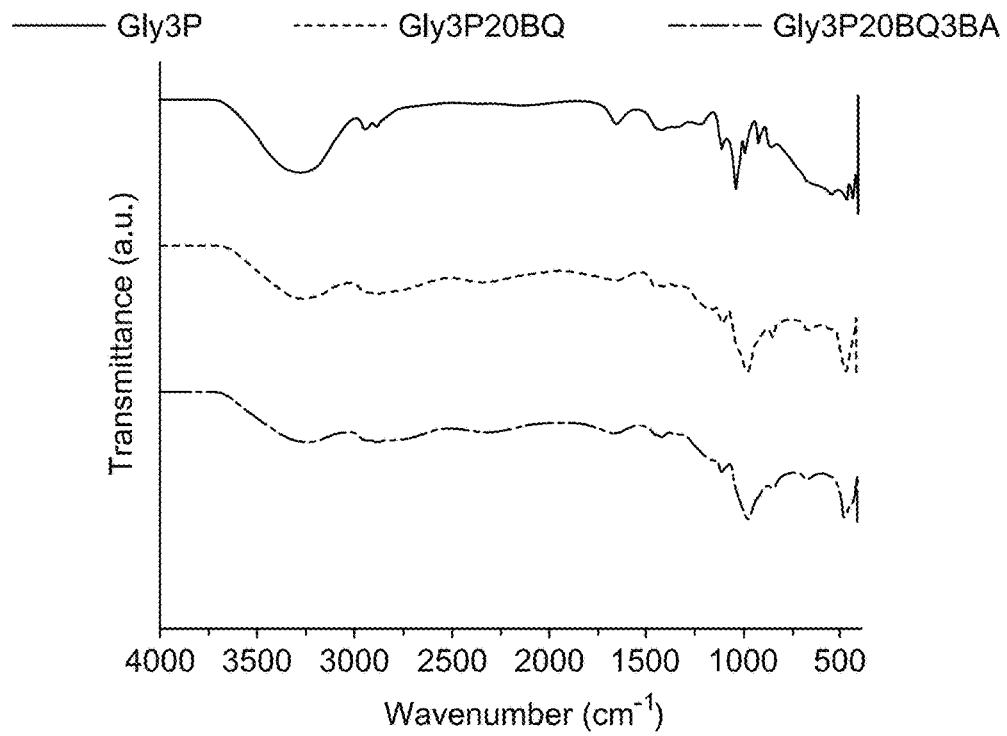
FIG. 2B shows Fourier Transform Infrared (FTIR) spectra for various non-aqueous electrolytes, according to certain embodiments.

FIG. 2A is a photograph of aqueous and non-aqueous electrolytes, including different ratios of BQ. The electrolytes that were prepared were used in supercapacitors. The aqueous electrolyte, including BQ, spreads faster and is closer to a liquid character, while the non-aqueous BQ has a viscous structure, and the reason for the dark color of some electrolytes is related to the BQ additive. The Fourier Transform Infrared (FT-IR) spectra of Gly3P illustrate absorptions at 1130-953 $cm^{-1}$ and are attributed to C—O and P—OH stretching, and the absorptions within 2950-2850 $cm^{-1}$ belong to C—H stretching. The broad peaks at 1355-1454 $cm^{-1}$ and 3400 $cm^{-1}$ are associated with C—H and O—H vibrations, respectively (FIG. 2B). The intercalation of BQ and BA has shifted the strong peak from 1028 $cm^{-1}$ to 970 $cm^{-1}$. Additionally, the peaks at 3400 $cm^{-1}$, 1028 $cm^{-1}$, and 1355-1454 $cm^{-1}$ are broadened by forming a hydrogen bonding network, creating an ordered pathway for faster ion transfer.

Figure 2C:
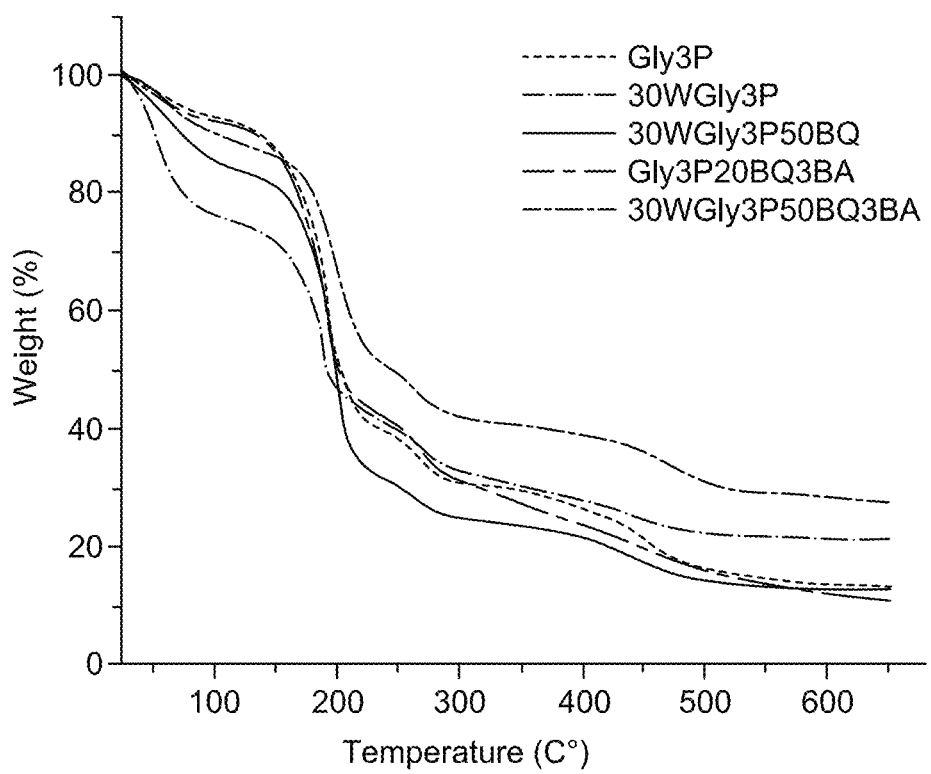
FIG. 2C shows thermogravimetric analysis (TGA) of aqueous and non-aqueous electrolytes, according to certain embodiments.

Thermograms of aqueous and non-aqueous BQ-mediated gel electrolytes are depicted in FIG. 2C. The materials are highly stable, and they make several weight decays until 650° C. The first weight loss up to 125° C. can be ascribed to the absorbed humidity of the electrolytes. The onset of the second weight loss at 170° C. can be explained by the intermolecular condensation of the acidic units, i.e., boric acid and polyphosphoric acid, and this degradation was observed until 300° C. Further degradation of the materials occurs above this temperature.

Figure 2D:
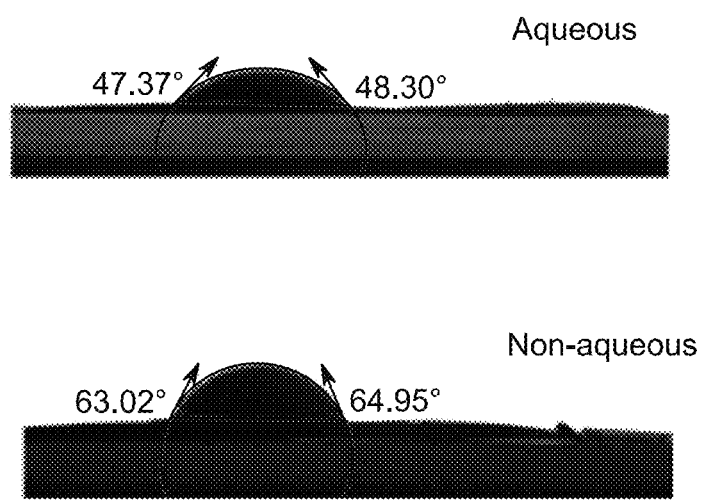
FIG. 2D shows contact angles of aqueous and non-aqueous electrolytes on an electrode surface, according to certain embodiments.

Contact angles of aqueous and non-aqueous electrolytes on activated carbon electrode surfaces are illustrated in FIG. 2D. As seen, the contact angle of the aqueous electrolyte on the carbon electrode surface has a lower value of 47.37 degrees compared to the non-aqueous electrolyte, which is 63.02 degrees. This result indicates an improvement in the interface between the non-aqueous electrolyte and the electrode surface, thus improving the charge transfer and the overall performance of the fabricated supercapacitor.

Figure 3:
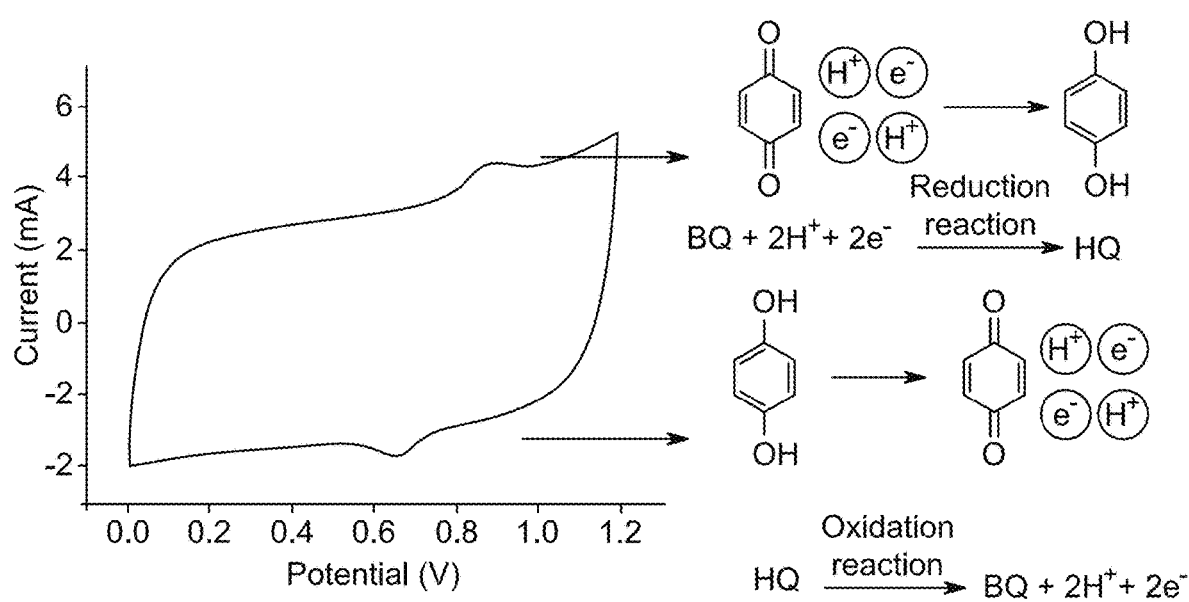
FIG. 3 shows an oxidation-reduction equation of BQ, which is observed in cyclic voltammogram (CV) recorded with 3M phosphoric acid in glycerol, according to certain embodiments.

FIG. 3 shows the oxidation-reduction equations of BQ, which is observed in the cyclic voltammogram (CV) recorded with 3 M phosphoric acid in Gly. The oxidation peak is located around 0.83 volts (V), where a pair of electrons ($2e^-$) is released during the forward scan. Peak currents scale linearly with the HQ concentration, and a reduction peak at 0.67 V is associated with the square root of the scan rate.

Figure 4A:
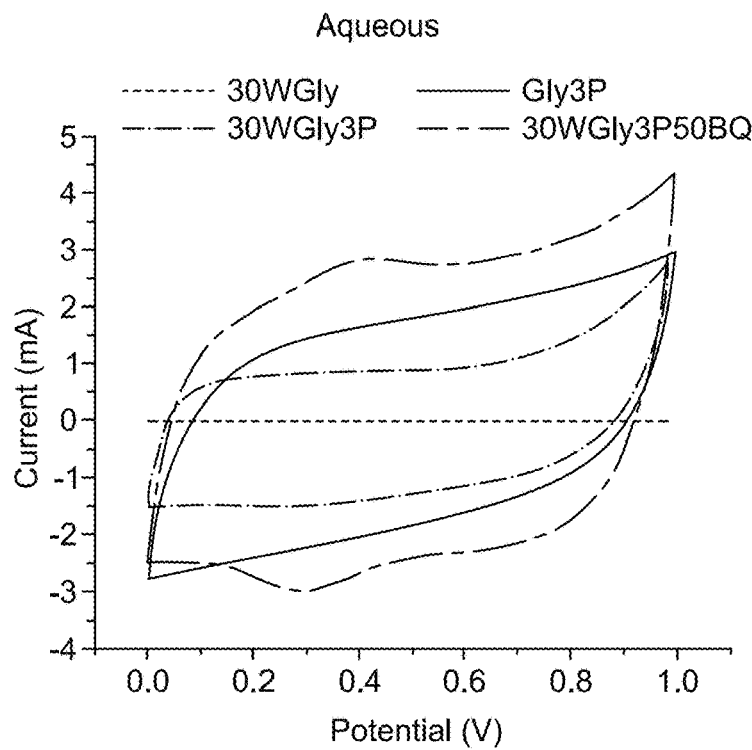
FIG. 4A shows CV curves of an aqueous BQ mediator-based electrolyte, according to certain embodiments.
Figure 4B:
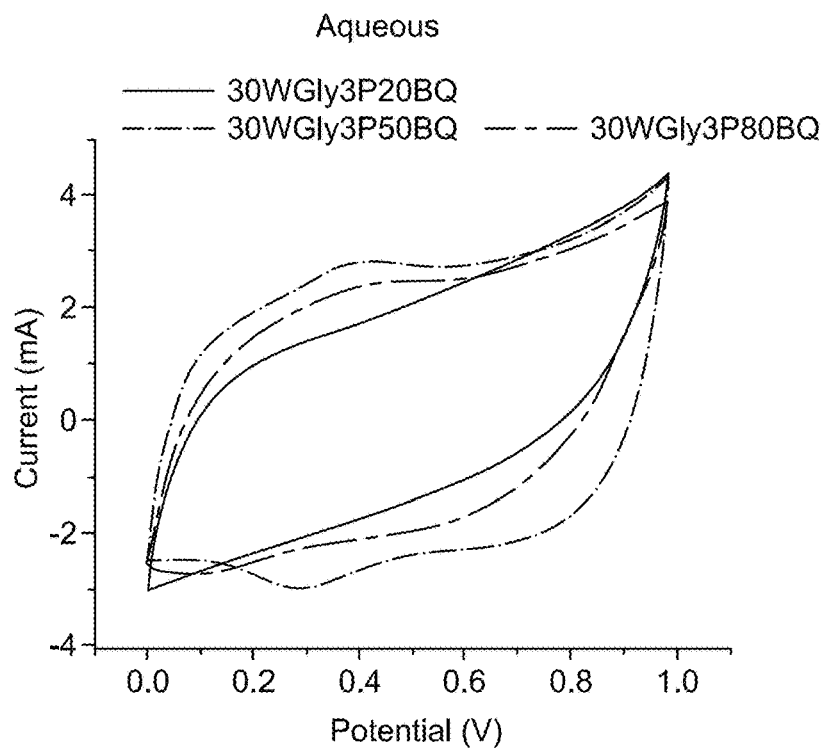
FIG. 4B depicts the effect of different scan rates on various aqueous BQ mediator-based electrolytes (30WGly3P20BQ, 30WGly3P50BQ, and 30WGly3P80BQ) at 1V, according to certain embodiments.

The CV measurements of the aqueous and non-aqueous BQ mediator electrolyte were studied at a potential window of 0 to 2 V range at a scan rate of 10 millivolts per second ($mV\ s^{-1}$), as shown in FIGS. 4A-4F. The CV voltammograms of aqueous BQ mediator electrolyte 30WGly3P and Gly3P show a quasi-rectangular shape indicating a suitable electric double layer capacitor (EDLC) pattern during the forward and reverse scan (FIG. 4A). The Gly3P50BQ exhibits quasi-rectangular EDLC and pseudocapacitive behavior with redox couples during the forward and reverse scan (Epa: 0.36 V and Epc: 0.31 V), where the capacitance of the 30WGly3P50BQ was moderate. An increase in current is observed on adding 50BQ to the aqueous mediator (30WGly3P), indicating that the electrolyte containing BQ raises the charge storage capacity of the system. On the other hand, for non-aqueous BQ mediator electrolytes, the increase in current up to 5 milliamperes (mA) was observed by adding 3BA to Gly3P20BQ, where the charge storage capacity of the supercapacitor increased. This can be explained by the creation of redox couples with pseudocapacitive performance, where the redox peaks shifted to Epa: 0.83 V and Epc: 0.67 V, while they disappeared for Gly3P20BQ.

Further, the CV curves of 30WGly3P50BQ (FIG. 4B) and Gly3P20BQ3BA (FIG. 4E), respectively, were evaluated at different scan rates from 1 to 150 $mV\ s^1$. As the scan rate increased, the current increased in 30WGly3P50BQ (FIG. 4B) and Gly3P20BQ3BA (FIG. 4E), which indicates the high ion transfer capability and the high-rate electrochemical performance of a supercapacitor. In both curves, the CV curves demonstrated a double-layer capacitance feature, as a rectangular-like shape, which refers to capacitance stored by the aggregation of electrolyte ions at the electrode-electrolyte interface.

Figure 4C:
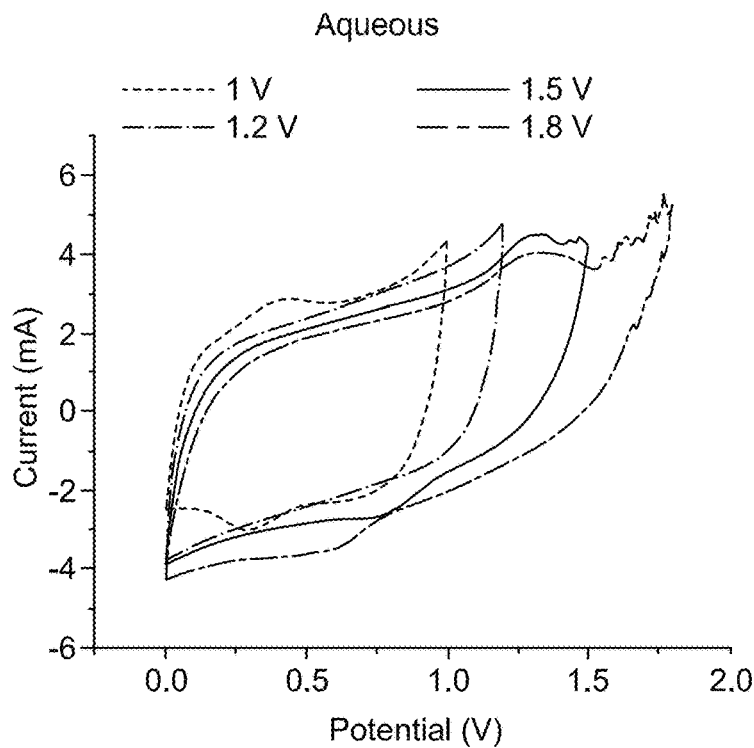
FIG. 4C shows the effect of different voltage on the 30WGly3P50BQ electrolyte at 10 mVs$^{-1}$, according to certain embodiments.
Figure 4D:
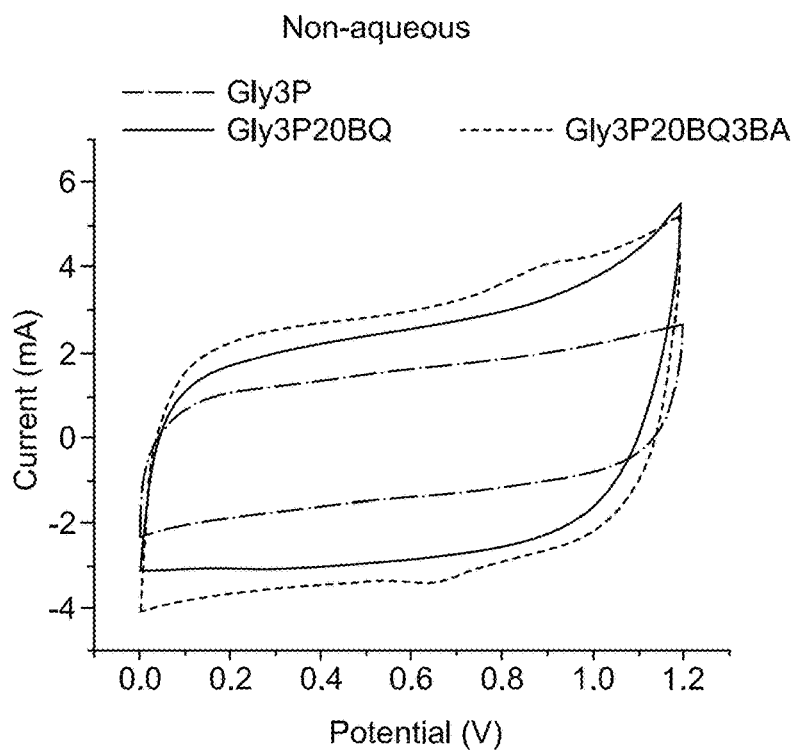
FIG. 4D shows CV curves of non-aqueous BQ mediator-based electrolytes (Gly3P, Gly3P20BQ, and Gly3P20BQ3BA), according to certain embodiments.
Figure 4E:
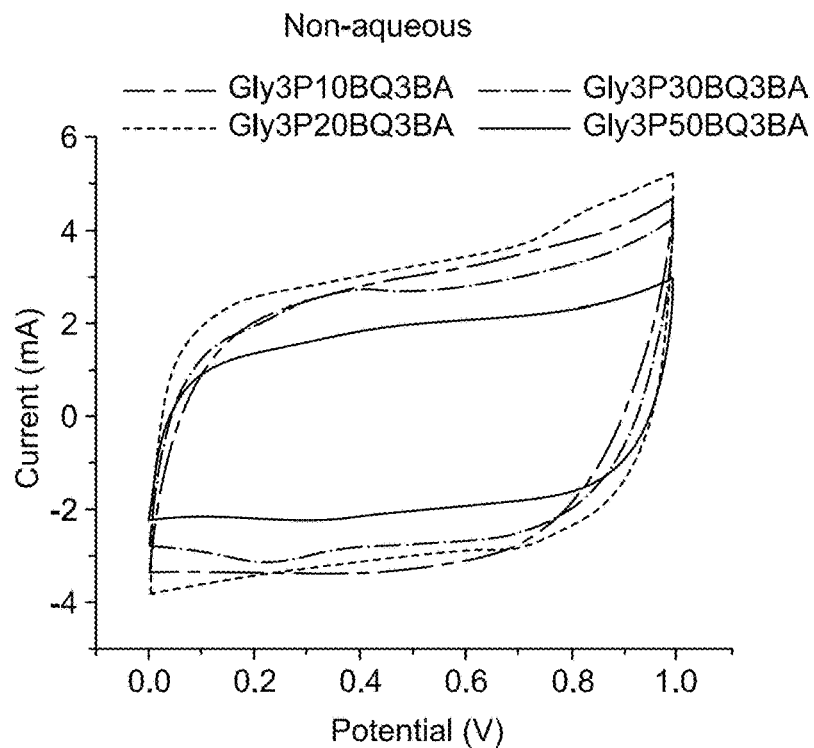
FIG. 4E depicts the effect of different scan rates on Gly3P20BQ3BA at 1.2V, according to certain embodiments.
Figure 4F:
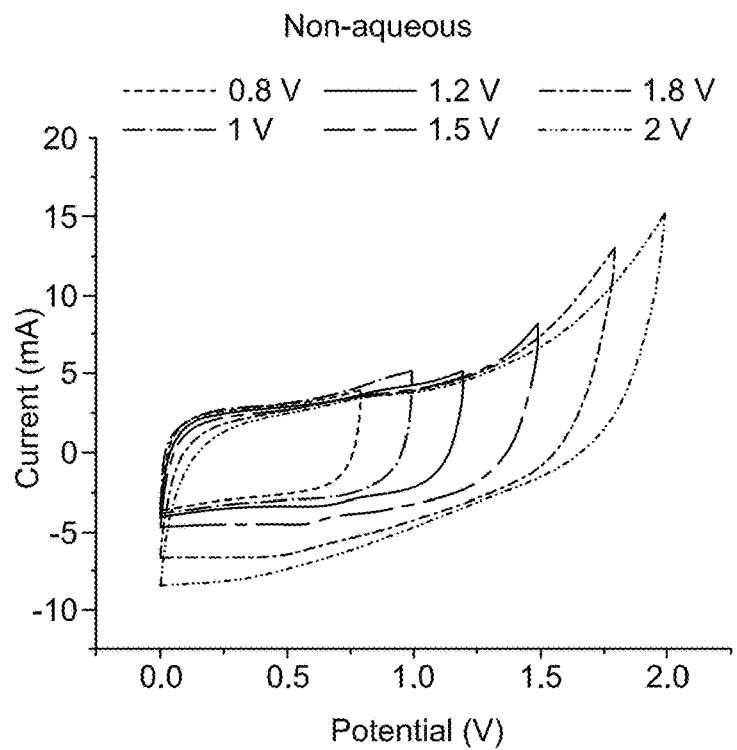
FIG. 4F shows the effect of different voltages on Gly3P20BQ3BA at 10 mVs$^{-1}$, according to certain embodiments.

CV curves of 30WGly5P50BQ and Gly3P20BQ3BA scanned at different voltage is shown in FIG. 4C and FIG. 4F. For 30WGly3P50BQ, it can be observed that quasi-rectangular EDLC and pseudocapacitive response are presented as the potential raises from 0 to 1.8V, while Epa and Epc value shifted to a high potential. The performance of the aqueous electrolyte (30WGly3P50BQ) is evident through the potential from 0 to 1.2 V (FIG. 4C). However, the quasi-rectangular EDLC behavior of the non-aqueous electrolyte (Gly3P20BQ3BA) was sustained and can work smoothly even at the higher potential rang up to 2 V with high-rate electrochemical performance (FIG. 4E).

Figure 5A:
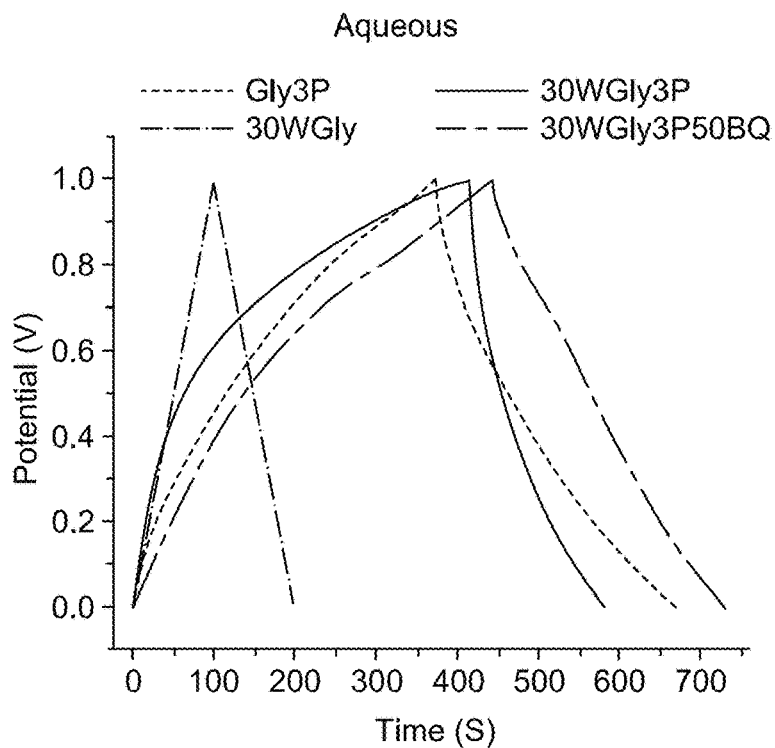
FIG. 5A shows galvanostatic charge-discharge (GCD) profiles of Gly3P and various aqueous BQ mediator-based electrolytes, according to certain embodiments.
Figure 5B:
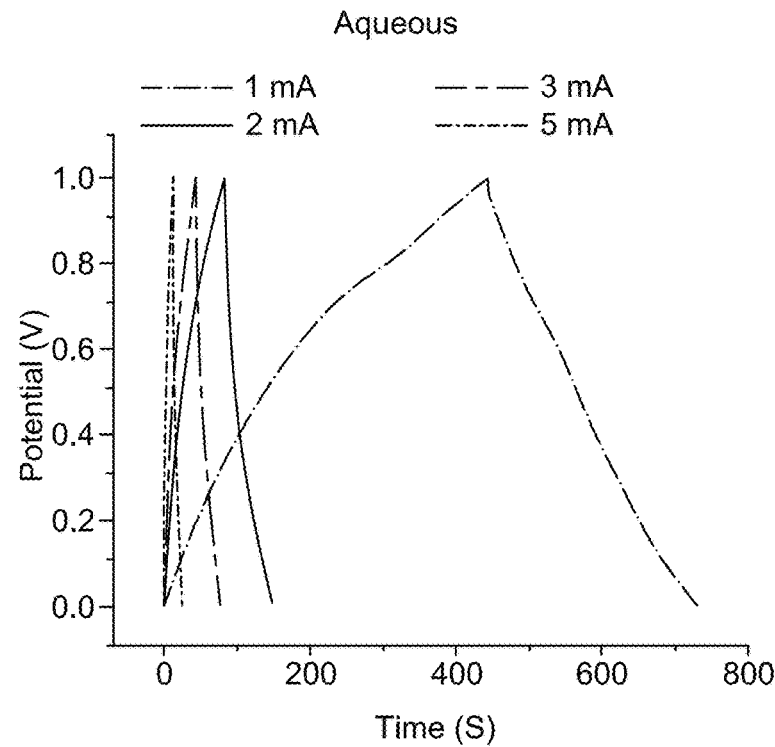
FIG. 5B shows GCD profiles of 30WGly3P50BQ at different current densities (1 mA-5 mA) at 1 V, according to certain embodiments.
Figure 5C:
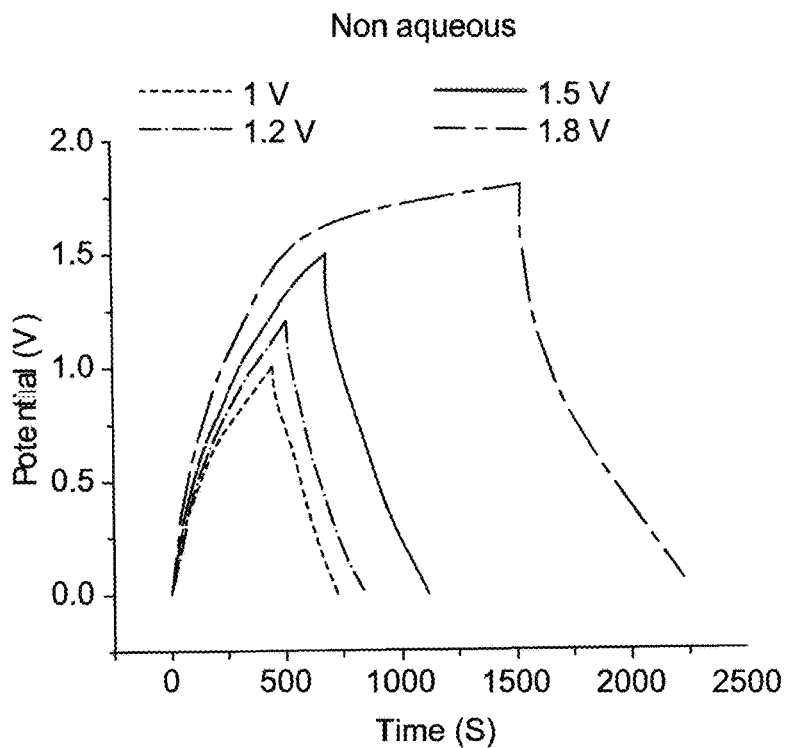
FIG. 5C shows GCD profiles of non-aqueous BQ mediator-based electrolytes at 1 mA, according to certain embodiments.

FIG. 5A depicts a comparative galvanostatic charge-discharge (GCD) analysis within a voltage range of 0-1 V, for different electrolytes, including Gly3P and aqua BQ mediator-based electrolytes such as 30WGly, 30WGly3P, and 30WGly3P50BQ. It was observed that the device possessing electrolyte based on aqua mediator containing benzoquinone along with phosphoric acid and glycerol (30WGly3P50BQ), not only exhibited the longest discharge time among all other electrolytes, but also demonstrated five times longer discharge time than Gly3P (without mediator), which confirms that the redox reactions in the aqua electrolyte dramatically increased the storage capability of the device. FIG. 5B presents the rate capability of a device comprising of 30WGly3P50BQ electrolyte, by performing GCD analysis, at varying current densities (1 mA-5 mA), within a potential range of 0 V to 1 V. It is evident from FIG. 5B that at the lowest current density (1 mA), the electrolyte exhibited the longest discharge time, thus indicating the highest specific capacitance. As the current density increased further, discharge time decreased due to the delay in the accumulation of the charges on the electrode surface. Similarly, by varying voltages (1 V-1.8 V), GCD analysis of aqua 30WGly3P50BQ electrolyte was conducted, and the results are presented in FIG. 5C, indicating that at the lowest voltage (1 V), the maximum charge/discharge time observed was 444 s/286 s, respectively.

Figure 5D:
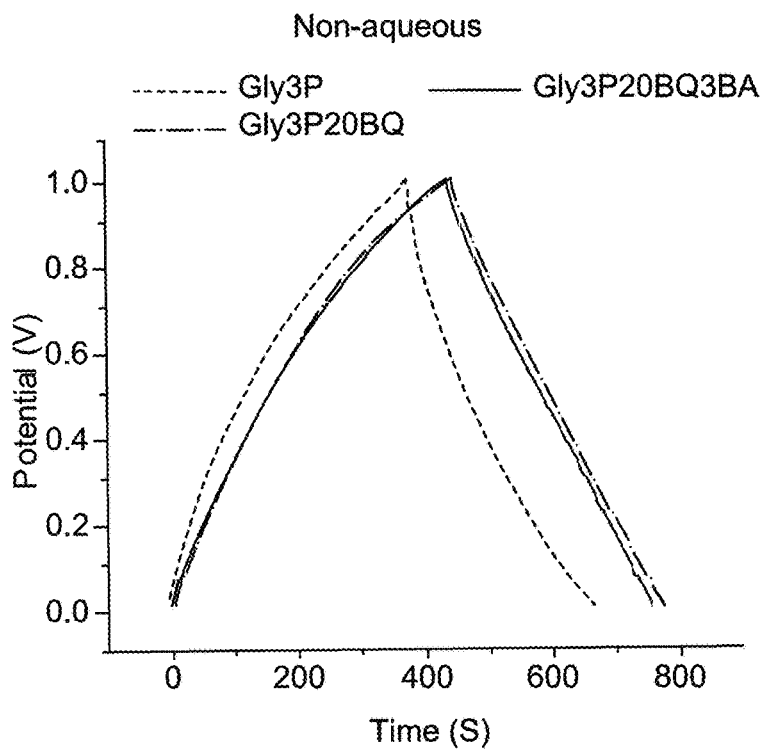
FIG. 5D is a plot comparing the electrochemical performance of Gly3P (without mediator) and non-aqueous redox mediator-based electrolytes, including Gly3P20BQ and Gly3P20BQ3BA, according to certain embodiments.

To compare the electrochemical performance of Gly3P (without mediator) and non-aqueous redox mediator-based electrolytes, including Gly3P20BQ and Gly3P20BQ3BA, the GCD measurements of respective electrolytes were conducted (FIG. 5D). Evidently, the non-aqua mediator electrolyte containing both benzoquinone and boric acid (Gly3P20BQ3BA), displayed longest discharge time compared to other electrolytes, confirming the excellent specific capacitance of the electrolyte.

Figure 5E:
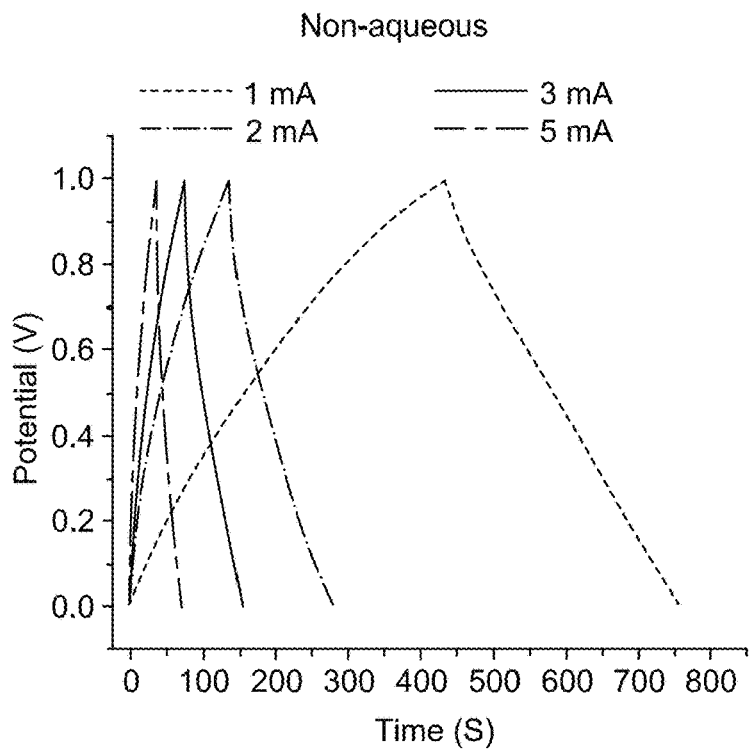
FIG. 5E shows GCD curves of Gly3P20BQ3BA at different current densities (1 mA-5 mA) at 1 V, according to certain embodiments.
Figure 5F:
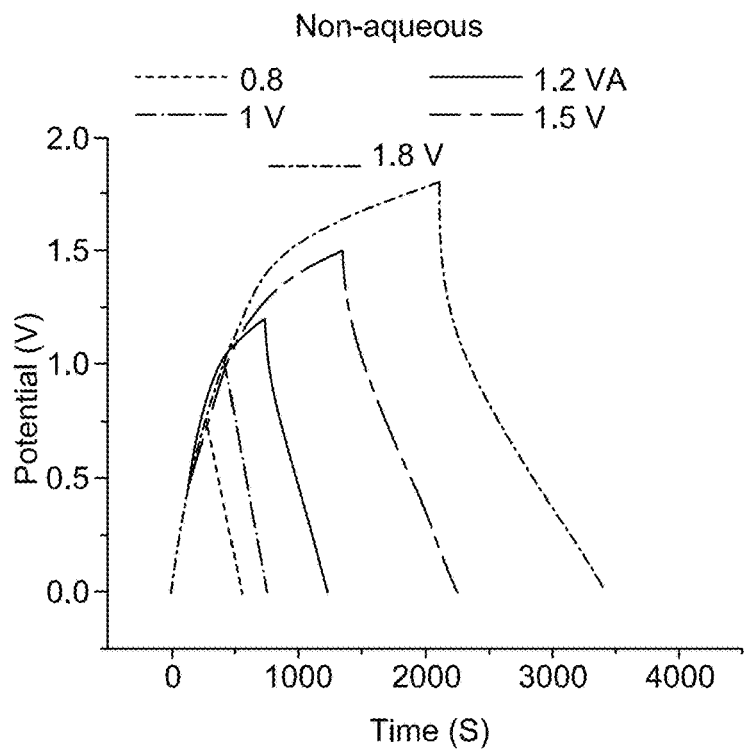
FIG. 5F shows GCD curves of Gly3P20BQ3BA at different voltages, according to certain embodiments.

FIG. 5E reveals the GCD analysis of Gly3P20BQ3BA, at different current densities (1 mA-5 mA), within a potential range of 0 V to 1 V. At 1 mA, the electrolyte exhibited the longest charging/discharging time, compared to other current densities, which shows that maximum specific capacitance was achieved at lowest current value. FIG. 5F presents a GCD analysis of Gly3P20BQ3BA, at a constant current density (1 mA) but in different potential windows from 0.8 V to 1.8 V. The additional resistance (IR drop) was found in between the GCD profiles obtained at 0.8 V, 1 V, and 1.2 V. Moreover, the longest discharging time was achieved with 1.2 V, and it can also be noted from FIG. 5D that the charging voltage of 1.8 V is too high to make the supercapacitor work properly.

Figure 6A:
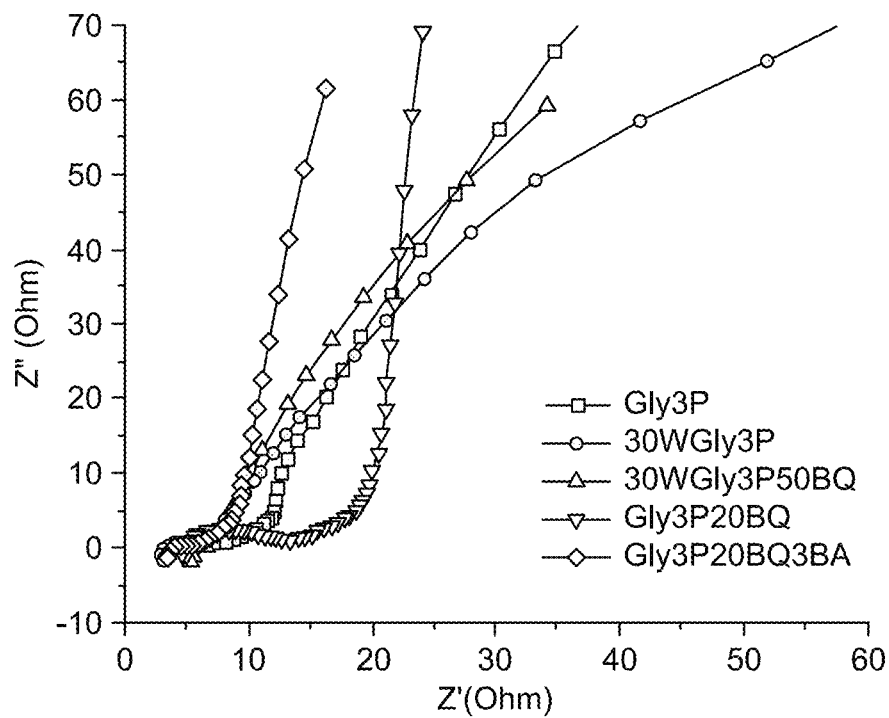
FIG. 6A shows Nyquist plots for various aqueous and non-aqueous BQ mediator-based electrolytes, according to certain embodiments.

FIG. 6A shows the Nyquist plot for different electrolyte compositions resulting from electrochemical impedance spectroscopy (EIS) over the frequency range of 10 hertz (Hz) to 100 kilohertz (kHz). Different resistance parameters relating to the device are analyzed by plotting the real and imaginary parts of impedance. In the low-frequency region, the plots are steeply rising, indicating that the devices are capacitive. Charge transfer resistance ($R_{ct}$) is related to the semi-circle in the medium-to-high frequency region. It is obvious from the diameter of the semi-circles that charge transfer resistance $R_{ct}$ is highest for Gly3P 5.3 ohm, and lowest for Gly3P20BQ3BA 3.3 ohm.

Figure 6B:
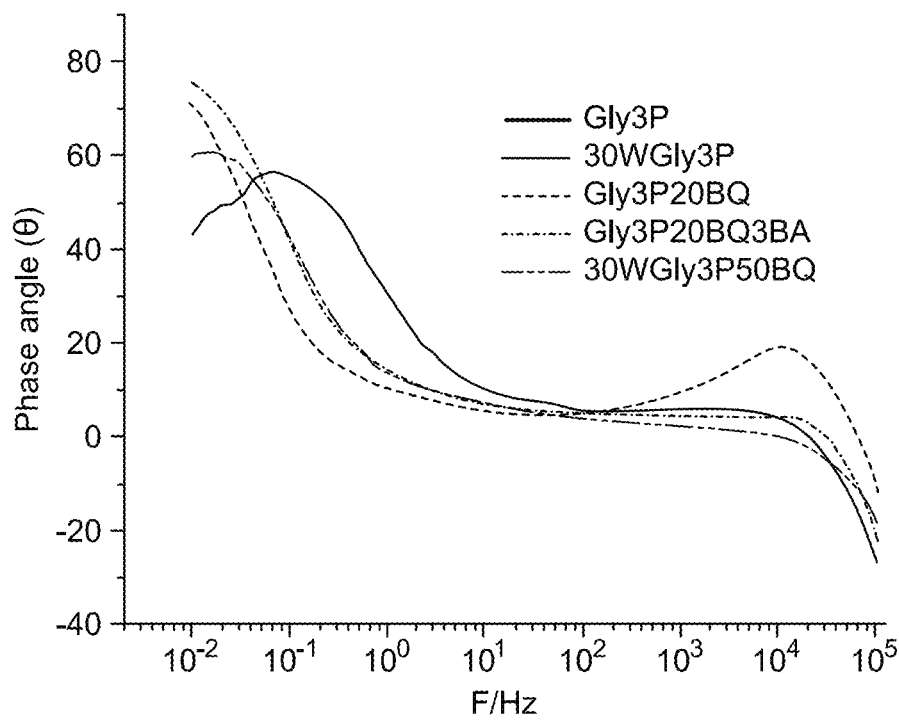
FIG. 6B shows phase angle versus frequency plots for various aqueous and non-aqueous BQ mediator-based electrolytes, according to certain embodiments.

A Bode plot is constructed by plotting phase angle against the frequency range of EIS measurements, as shown in FIG. 6B. Due to the inverse relationship between capacitance and frequency, the system exhibits resistive behavior at high frequencies. The physical parameters determine the capacitance at intermediate frequency. On the other hand, the electrochemical system behaves like a capacitor at low frequency. At low frequencies, the phase angle for all electrolyte-containing devices is less than 90. Specifically, Gly3P20BQ3BA is measured to be 75.39.

Based on the impedance obtained from the EIS analysis, the real and imaginary parts of capacitances are calculated as C' and C", respectively. As a result of the following equations.

$$C' = -\frac{Z''(\omega)}{\omega|Z(\omega)|^2}$$

$$C'' = -\frac{Z'(\omega)}{\omega|Z(\omega)|^2}$$

Figure 6C:
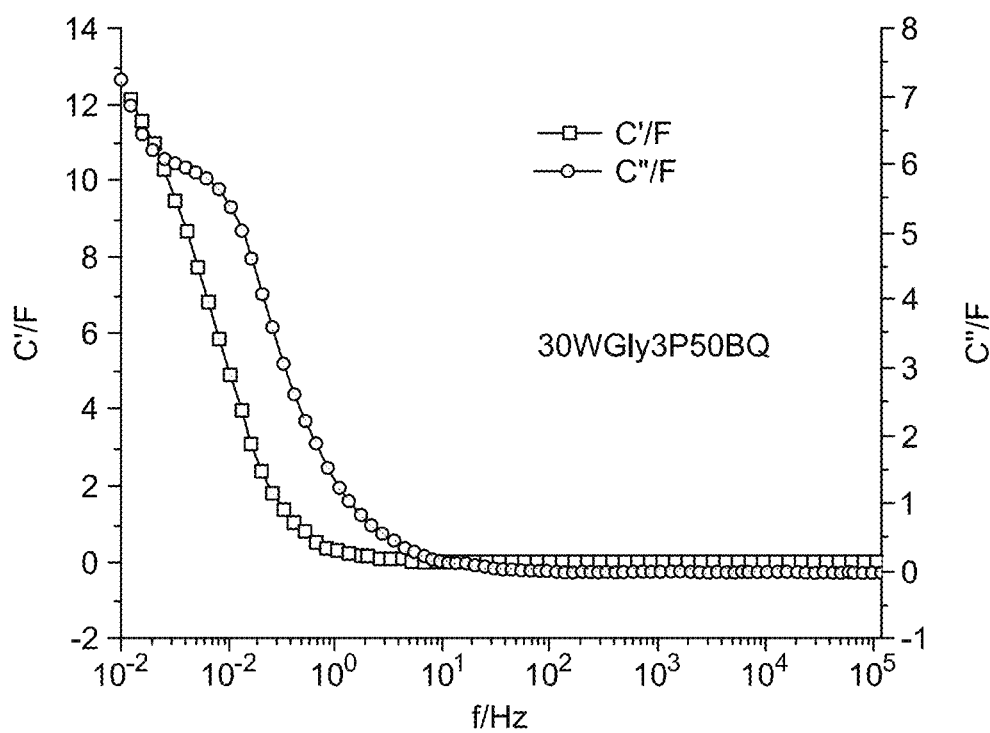
FIG. 6C shows C' and C" vs. frequency of the 30WGly3P50BQ electrolyte, according to certain embodiments.
Figure 6D:
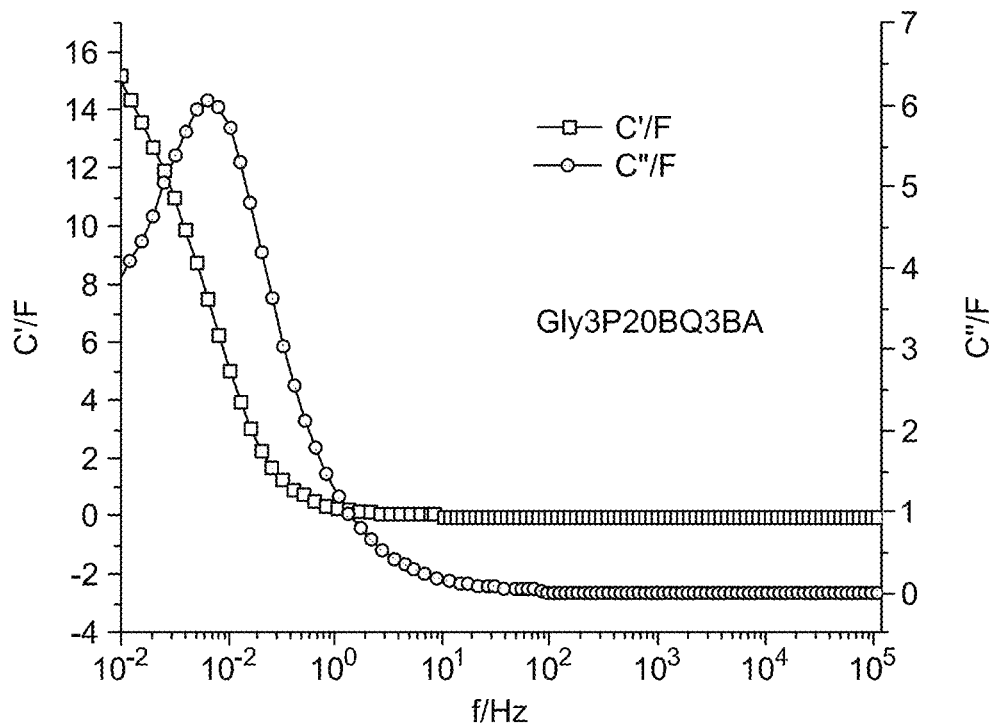
FIG. 6D shows C' and C" vs. frequency of the Gly3P20BQ3BA electrolyte, according to certain embodiments.

The sharp increase in the C' and C" values is close to −1 Hz frequency for 30WGly3P50BQ and Gly3P20BQ3BA electrolyte, as shown in FIG. 6C and FIG. 6D, respectively. For 30WGly3P50BQ and Gly3P20BQ3BA electrolyte, the slope of C' versus frequency curve is zero from 105 Hz to ~1 Hz and then becomes frequency dependent from 1 Hz to 0.01 Hz. On the other hand, the slope of C" versus frequency curve for both electrolytes becomes zero from 105 Hz to ~10 Hz.

Figure 7:
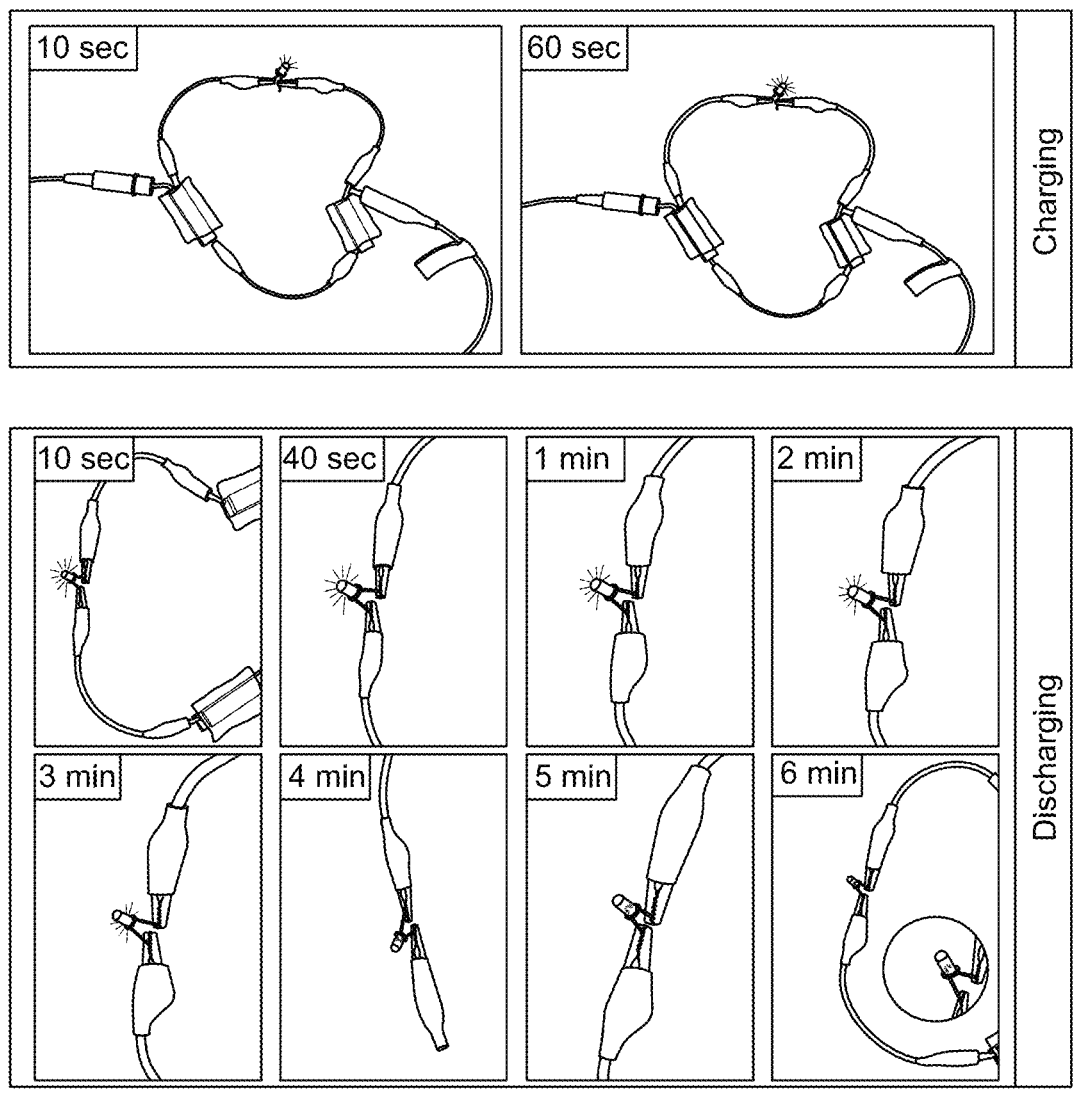
FIG. 7 shows photographs depicting practical performance of a mini-prototype supercapacitor device containing the Gly3P20BQ3BA redox bio-electrolyte during charging, with light emitting diode (LED) glowing at various times, during the discharge process, according to certain embodiments.

The practical application of the Gly3P20BQ3BA redox bio-electrolyte supercapacitor was demonstrated using a custom-built mini-prototype device using a Gly3P20BQ3BA electrolyte between two activated carbon electrodes coated with heat-resisting tape as supporting material. The device was charged with ~2 V using an electrometer for 60 s. FIG. 7 displays the charging of the supercapacitor and the discharging response of the LED at various discharge times. The LED glowed for up to 6 min with 60 s of charging. The LED light was strongly illuminated during the discharging of the device. This demonstration strongly supported the practical applicability of the Gly3P20BQ3BA redox mediator electrolyte.

Figure 8A:
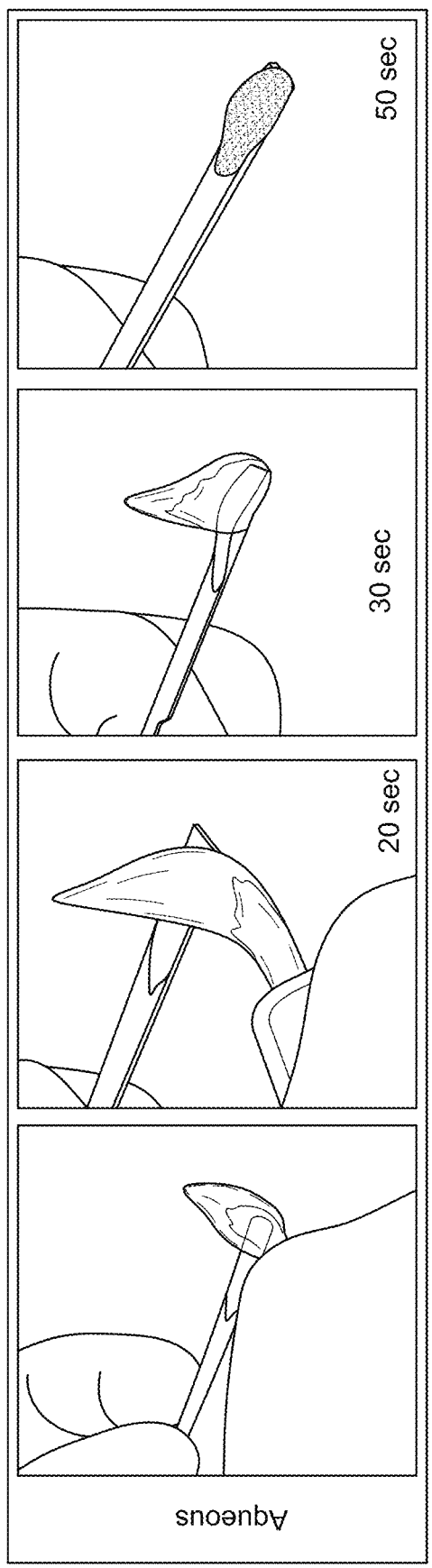
FIG. 8A shows a comparative flammability test for an aqueous electrolyte, according to certain embodiments.
Figure 8B:
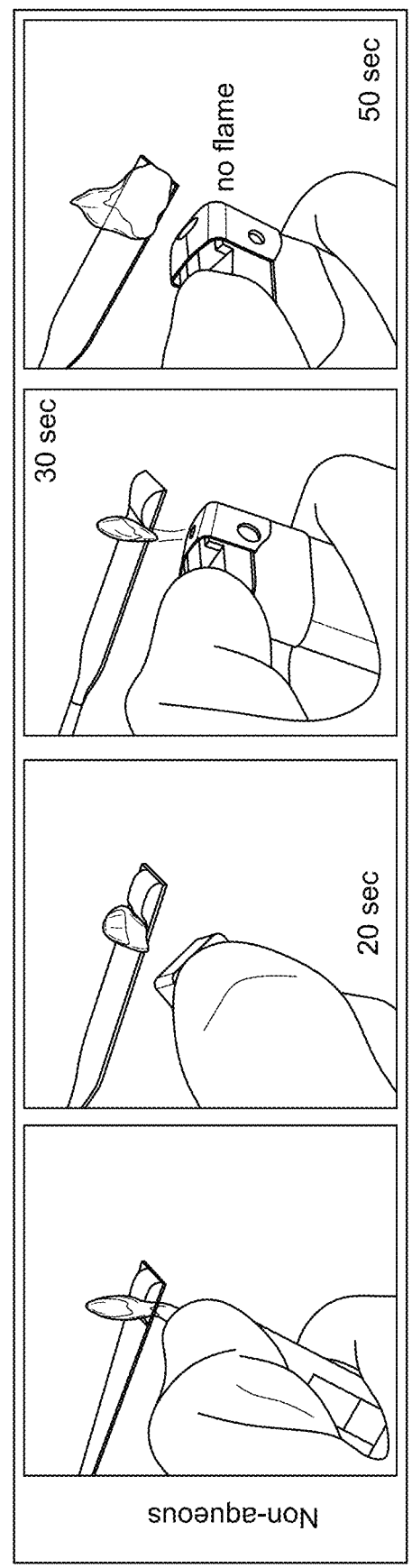
FIG. 8B shows a comparative flammability test for a non-aqueous electrolyte, according to certain embodiments.

The non-flammability, which is an intrinsic property of ionic liquid-based electrolytes, also is an important criterion for the safety. Comparative flammability test for aqueous electrolyte (30WGly3P50BQ), and non-aqueous electrolyte (Gly3P20BQ3BA) is shown in FIG. 8. It was observed that the aqueous electrolyte (FIG. 8A) slowly caught fire after 19 sec, and the non-aqueous electrolyte (FIG. 8B) did not catch fire to produce a flame at all. Thus, it demonstrates that the electrolyte with BQ and BA additives is safer than the aqueous organic electrolyte that contains water.

Figure 9A:
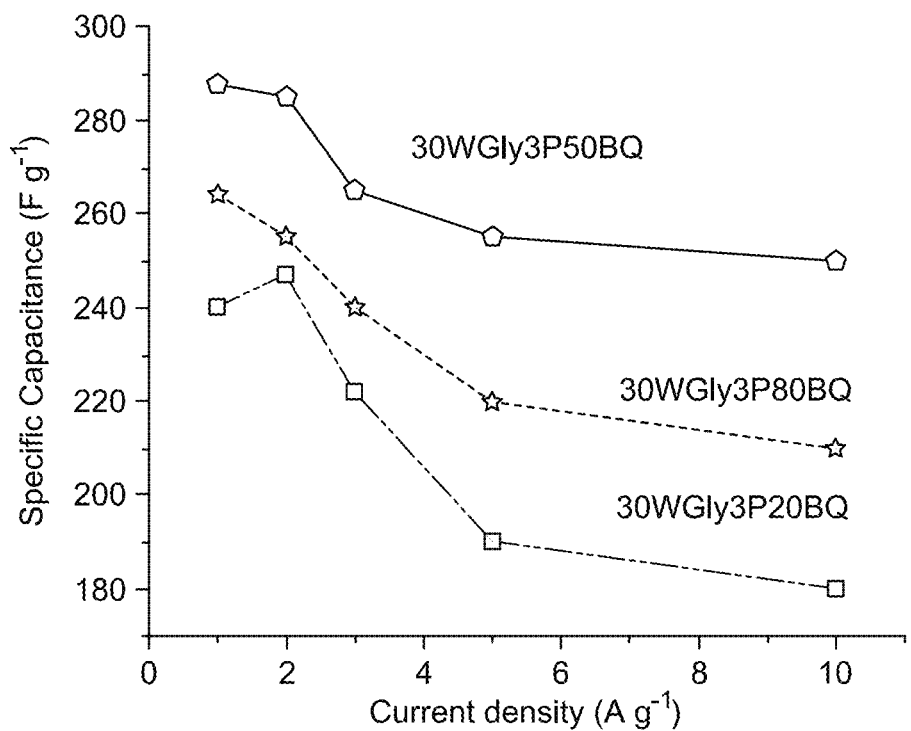
FIG. 9A shows specific capacitance vs current density of the devices with the aqueous electrolytes (30WGLYP5BQ50, 30WGLYP5BQ80, and 30WGLYP5BQ20), according to certain embodiments.
Figure 9B:
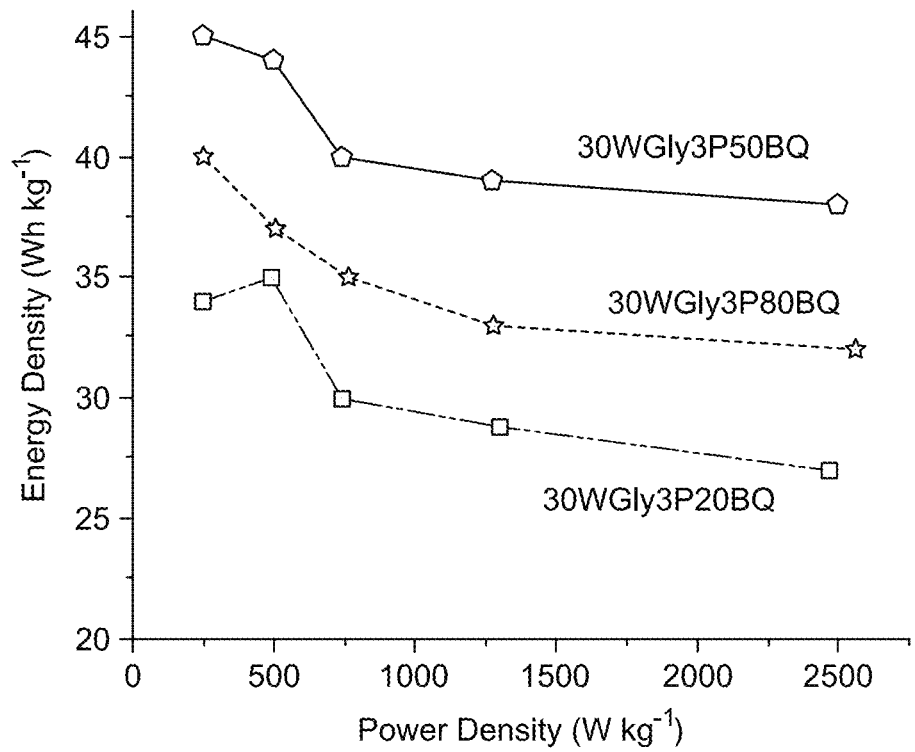
FIG. 9B shows Ragone plots of various aqueous electrolytes (30WGLYP5BQ50, 30WGLYP5BQ80 and 30WGLYP5BQ20), according to certain embodiments.
Figure 9C:
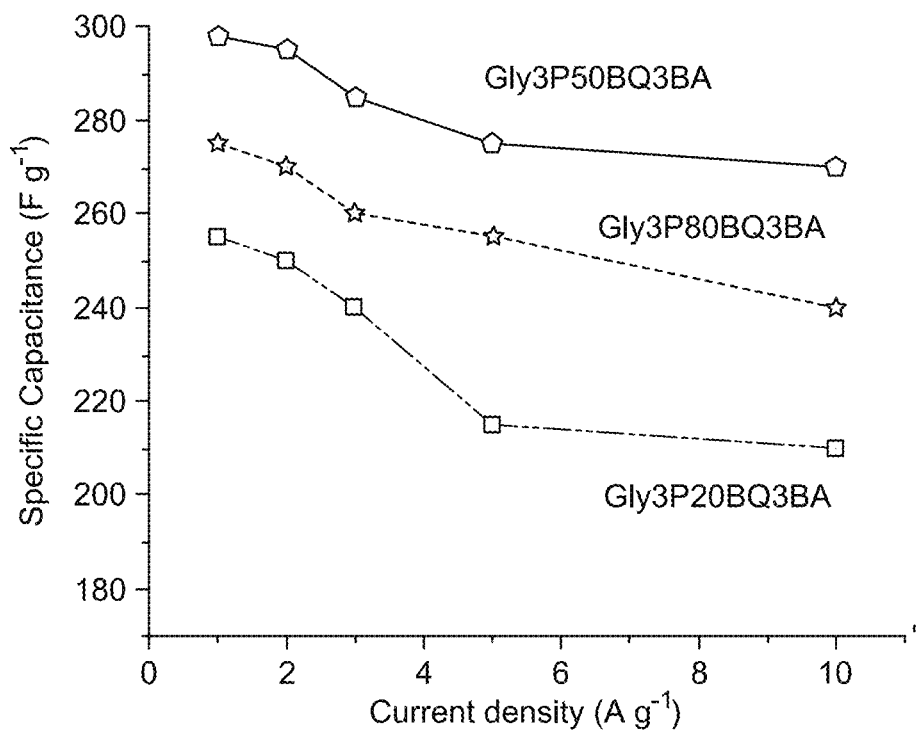
FIG. 9C shows a plot of specific capacitance as a function of current density for the devices with the non-aqueous electrolytes (GLY5P50BQ3BA, GLY5P80BQ3BA, and GLY5P20BQ3BA), according to certain embodiments.
Figure 9D:
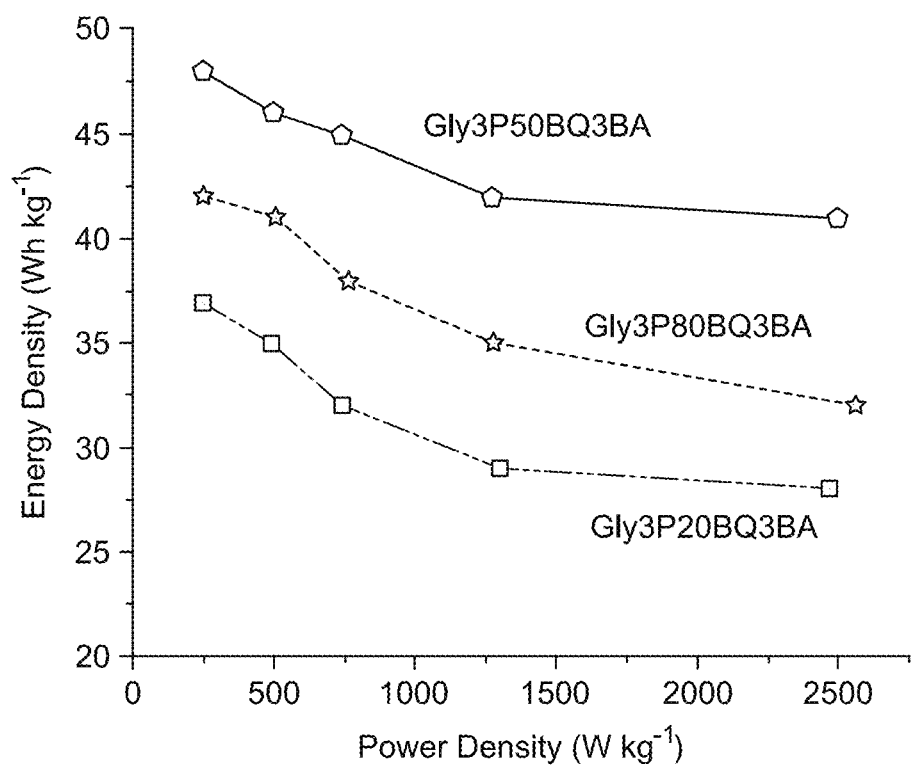
FIG. 9D shows Ragone plots of various non-aqueous electrolytes (GLY5P50BQ3BA, GLY5P80BQ3BA, and GLY5P20BQ3BA), according to certain embodiments.
Figure 9E:
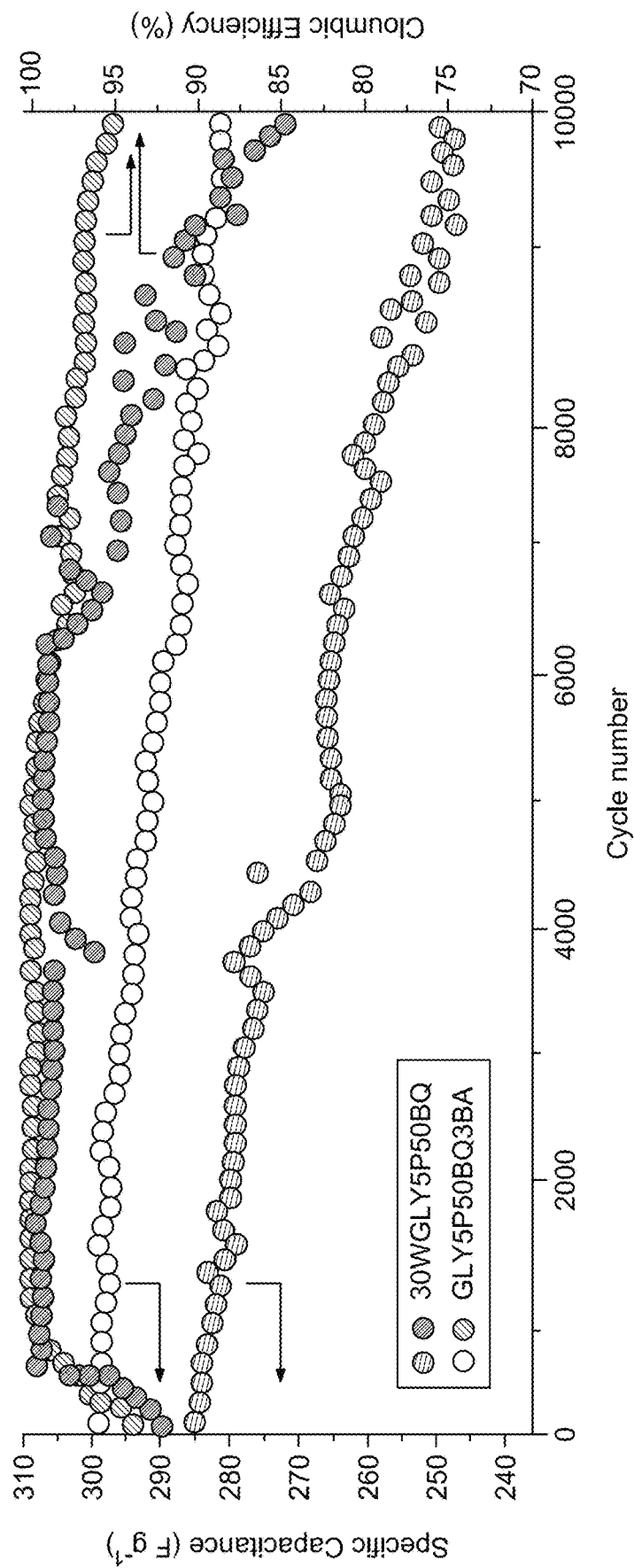
FIG. 9E shows the cyclic performance and coulombic efficiency of the devices with aqueous (30WGLYP5BQ50) and non-aqueous electrolytes (GLY5P50BQ3BA), according to certain embodiments.

Plots of specific capacitance vs current density of the devices with aqueous and non-aqueous electrolytes are illustrated in FIGS. 9A and 9C, respectively. The supercapacitors with 30WGLYP50BQ and GLY5P50BQ3BA showed the highest capacitance performance, corresponding to 289 F/g and 298 F/g at 1 mA. Ragone plots of the as-assembled devices with aqueous electrolytes 30WGLYP5BQ50, 30WGLYP5BQ80, 30WGLYP5BQ20 and non-aqueous electrolytes GLY5P50BQ3BA GLY5P80BQ3BA and GLY5P20BQ3BA are illustrated in FIGS. 9B and 9D, respectively. The non-aqueous electrolyte, GLY5P50BQ3BA, has the highest specific energy of 48 Wh/kg at a specific power of 270 W/kg. The better storage capacity of the device with GLY5P50BQ3BA can be described by better wettability of the carbon electrode by the non-aqueous electrolyte. The cyclic performance of the devices with aqueous and non-aqueous electrolytes are analyzed at 1 $Ag^{-1}$, as shown in FIG. 9E. Both devices with 30WGLYP5BQ50 and GLY5P50BQ3BA electrolytes have shown promising performance during 10000 cycles. The coulombic efficiency of the device with GLY5P50BQ3BA is around 95% which better than that of 30WGLYP5BQ50 corresponding to 85% after 10000 cycles.

The present disclosure describes a comparative study on redox electrolytes with glycerol, hydroxy benzoquinone, phosphoric acid, and boric acid for supercapacitor performance testing in aqueous and non-aqueous medium with carbon electrodes. The boric acid insertion in non-aqueous electrolytes endows a non-flammability character to the redox system. It has been demonstrated that the BQ in the aqueous/nonaqueous glycerol electrolyte offers an improvement in the electrochemical properties of the supercapacitor in terms of specific capacitance and specific energy. This increment is due to the faradaic redox reaction of BQ in Gly that undergoes in both aqueous and anhydrous medium. The faradaic contribution and voltage stability of anhydrous electrolytes is higher than aqueous electrolytes. This finding paves the way for the application of these highly stable, cost-effective, non-flammable, wider operating potential redox electrolytes to various technological energy storage systems.

Numerous modifications and variations of the present disclosure are possible in light of the above teachings. It is therefore to be understood that within the scope of the appended claims, the invention may be practiced otherwise than as specifically described herein.

The invention claimed is:

1. A supercapacitor, comprising:
two electrodes; and
a gel electrolyte,
wherein the gel electrolyte comprises:
glycerol;
benzoquinone;
phosphoric acid; and
boric acid,
wherein the gel electrolyte is non-aqueous,
wherein the glycerol, phosphoric acid, and boric acid form a hydrogen bonding network, and
wherein the benzoquinone is homogeneously dispersed within the hydrogen bonding network,
wherein the two electrodes each comprise:
a substrate; and
a mixture of a conductive additive, a binding compound, and an activated carbon at least partially coated on an inner surface of the substrate, and
wherein the two electrodes are disposed with the inner surfaces facing each other separated by the gel electrolyte to form the supercapacitor.

2. The supercapacitor of claim 1, wherein the mixture comprises 5-10 wt. % of the conductive additive, 5-10 wt. % of the binding compound, and 80-90 wt. % of the activated carbon, based on the total weight of the conductive additive, the binding compound, and the activated carbon.

3. The supercapacitor of claim 1, wherein the gel electrolyte comprises 1-60 wt. % of the benzoquinone, based on a total weight of the phosphoric acid and the glycerol.

4. The supercapacitor of claim 1, wherein in the gel electrolyte the phosphoric acid has a molarity of 1-5 molar (M) in the glycerol.

5. The supercapacitor of claim 1, wherein in the gel electrolyte the boric acid has a molarity of 1-5 M in the glycerol.

6. The supercapacitor of claim 1, wherein the gel electrolyte comprises 1-60 wt. % of the benzoquinone, based on a total weight of the phosphoric acid and the glycerol,
wherein in the gel electrolyte the phosphoric acid has a molarity of 1-5 M in the glycerol, and
wherein in the gel electrolyte the boric acid has a molarity of 1-5 M in the glycerol.

7. The supercapacitor of claim 1, wherein the gel electrolyte produces no fire after treatment with a flame.

8. The supercapacitor of claim 1, wherein the gel electrolyte has a surface contact angle of 60-70°.

9. The supercapacitor of claim 1, wherein the gel electrolyte is made by a method comprising:
mixing a 1-5 M solution of the phosphoric acid in the glycerol to form a phosphoric acid solution;
mixing 1-60 wt. % of the benzoquinone with the phosphoric acid solution to form a benzoquinone solution; and
mixing an amount of the boric acid to be 1-5 M in the benzoquinone mixture to form the gel electrolyte.

10. The supercapacitor of claim 1, wherein the binding compound is a fluorinated polymer.

11. The supercapacitor of claim 1, wherein the conductive additive is at least one selected from the group consisting of graphite, reduced graphene oxide, carbon nanotubes, carbon nanofibers, and carbon black.

12. The supercapacitor of claim 1, wherein the substrate is made from at least one material selected from the group consisting of copper, aluminum, nickel, iron, and steel.

13. The supercapacitor of claim 1, having a specific capacitance of 250-300 farads per gram (F/g) at 1 ampere per gram (A/g).

14. The supercapacitor of claim 1, wherein the supercapacitor maintains at least 90% of a capacitance after 10,000 charge/discharge cycles.

15. The supercapacitor of claim 1, having a specific energy of 40-55 watt-hour per kilogram (Wh/kg) at a power of 270 watt per kilogram (W/kg).

16. A wearable device comprising the supercapacitor of claim 1, wherein the supercapacitor is electrically connected to a sensor, and
the supercapacitor functions as a battery.

17. A power bank, comprising 2-10 of the supercapacitors of claim 1 connected in parallel and/or series.

* * * * *